(12) United States Patent
Liu et al.

(10) Patent No.: US 10,374,376 B2
(45) Date of Patent: Aug. 6, 2019

(54) DIVIDED PULSE NONLINEAR OPTICAL SOURCES

(71) Applicant: The Penn State Research Foundation, University Park, PA (US)

(72) Inventors: Zhiwen Liu, State College, PA (US); Victor Bucklew, State College, PA (US); Perry Edwards, State College, PA (US); Chenji Zhang, State College, PA (US)

(73) Assignees: The Penn State Research Foundation, University Park, PA (US); Atoptix, Inc., State College, PA (US)

( * ) Notice: Subject to any disclaimer, the term of this patent is extended or adjusted under 35 U.S.C. 154(b) by 0 days.

(21) Appl. No.: 15/980,839

(22) Filed: May 16, 2018

(65) Prior Publication Data

US 2018/0337508 A1 Nov. 22, 2018

Related U.S. Application Data

(60) Provisional application No. 62/507,371, filed on May 17, 2017.

(51) Int. Cl.
*H01S 3/00* (2006.01)
*G01J 3/02* (2006.01)
(Continued)

(52) U.S. Cl.
CPC .......... *H01S 3/0071* (2013.01); *G01J 3/0205* (2013.01); *G01J 3/0218* (2013.01); *G01J 3/0224* (2013.01); *G01J 3/0237* (2013.01); *G01J 3/0245* (2013.01); *G01J 3/10* (2013.01); *G01J 3/42* (2013.01); *G01J 3/44* (2013.01);

*G02B 27/10* (2013.01); *G02F 1/39* (2013.01); *H01S 3/0057* (2013.01); *H01S 3/0092* (2013.01); *H04J 14/02* (2013.01);
(Continued)

(58) Field of Classification Search
CPC .... H01S 3/0071; H01S 2301/08; H01S 3/005; H01S 3/0057; H01S 3/0092; G01J 3/0205; G01J 3/0218; G01J 3/0224; G01J 3/0237; G01J 3/0245; G01J 3/10; G01J 3/42; G01J 3/44; G01J 2003/1282; G02B 27/10; H04J 14/02; G02F 1/35
USPC ............................................................ 398/79
See application file for complete search history.

(56) References Cited

U.S. PATENT DOCUMENTS

2010/0142034 A1* 6/2010 Wise .................. H01S 3/0057
359/349
2012/0230353 A1* 9/2012 Xu .................... H01S 3/06712
372/6

(Continued)

*Primary Examiner* — Dalzid E Singh
(74) *Attorney, Agent, or Firm* — Buchanan Ingersoll & Rooney PC

(57) ABSTRACT

A divided pulse nonlinear optical source may be generated by combining nonlinear wave generation techniques with pulse division that can divide a parent pulse into N divided pulses, each divided pulse separate temporally. The N divided pulses can be passed into a nonlinear optical medium to generate an output. The output can include at least one output pulse for each divided pulse. The center wavelengths of each output pulse can be tuned so that each may have a center wavelength that is the same as, or differs from, each other output pulse. In some embodiments, the output pulses may be combined to generate the output. The output can be power scalable and wavelength tunable.

20 Claims, 18 Drawing Sheets

(51) Int. Cl.
    *G01J 3/10*     (2006.01)
    *G01J 3/42*     (2006.01)
    *G01J 3/44*     (2006.01)
    *G02B 27/10*    (2006.01)
    *G01J 3/12*     (2006.01)
    *H04J 14/02*    (2006.01)
    *G02F 1/39*     (2006.01)

(52) U.S. Cl.
    CPC ....... *G01J 2003/1282* (2013.01); *H01S 3/005* (2013.01); *H01S 2301/08* (2013.01)

(56) References Cited

U.S. PATENT DOCUMENTS

2017/0307957 A1* 10/2017 Kato ................. G02F 1/353
2018/0307117 A1* 10/2018 MacGillivray ....... G02F 1/3551

\* cited by examiner

DIVIDED PULSE NONLINEAR OPTICAL SOURCES

CROSS-REFERENCE TO RELATED APPLICATIONS

This application is related to and claims the benefit of U.S. Provisional Application Ser. No. 62/507,371, filed on May 17, 2017, the entire contents of which is incorporated herein by reference.

STATEMENT REGARDING FEDERALLY SPONSORED RESEARCH OR DEVELOPMENT

This invention was made with government support under Grant No. GM113563, awarded by the National Institutes of Health. The Government has certain rights in the invention.

FIELD OF THE INVENTION

Embodiments of the invention are directed to divided pulse nonlinear optical sources, and more specifically to a divided pulse optical parametric oscillator (DOPO), divided pulse optical parametric amplifier (DOPA), divided pulse soliton self-frequency shift source, or any other type of nonlinear optical processes which are intensity or peak power limited.

BACKGROUND OF THE INVENTION

Nonlinear optical imaging for practical applications (e.g., biological, medical, etc.) can depend on the availability of suitable ultrafast optical sources. For example, ultrafast optical sources may provide the ability for nonlinear optical instrumentation to penetrate deeper into biological tissue and provide greater sample selectivity. Yet, conventional nonlinear optical sources may be bulky and/or of high cost. Conventional sources may lack the ability to provide sufficient power at a desired wavelength. For example, conventional soliton self-frequency shift sources may be limited by a required one-to-one mapping between a pulse's peak power and the pulse's center wavelength. Conventional sources may also not be able to be tuned across a suitable range of wavelengths, or be able to facilitate tuning pule outputs independently. These and other disadvantages may limit the use of nonlinear optical apparatuses.

SUMMARY OF THE INVENTION

Embodiments of the system can include at least one optical processing device that may be used to divide a parent pulse into at least two divided pulses. For example, the system can include a division stage to divide a parent pulse into at least two divided pulses. Each divided pulse can have a polarization that is the same or different from the polarization of another divided pulse. Each divided pulse can be shifted temporally relative to another divided pulse. The output from the division stage can be referred to as a pulse train. The system can include wave plates and/or polarizing beam splitters to facilitate adjusting the polarization and/or power of any one divided pulse. The pulse train may be directed through a nonlinear optical medium to produce a corresponding output pulse train. At least one output pulse of the output pulse train exiting the nonlinear optical medium may have a wavelength that differs from the wavelength of the pulse train that enters the nonlinear optical medium. For example, each divided pulse can be caused to undergo a controlled soliton self-frequency shift via a nonlinear optical fiber to generate an output pulse having a wavelength that differs from a wavelength of the divided pulse.

In some embodiments, the center wavelengths of each output pulse can be tuned to exhibit a center wavelength that is different from a center wavelength of another output pulse. This may facilitate generating an output for the system that can include a multi-color output pulse train. For example, an output can include a plurality of output pulses, each with a different center wavelength.

In some embodiments, the center wavelengths of each output pulse can be tuned to exhibit a center wavelength that is the same as the center wavelength of another output pulse. This may facilitate generating an output for the system that can include a single-color output pulse train. For example, an output can include a plurality of output pulses, each with a same center wavelength.

Embodiments of the system can be used for scaling the system output power. For example, with conventional systems based on soliton self frequency shift, attempting to adjust the power may not be achievable without causing an undesired shift in wavelength in the output. Embodiments of the inventive system, however, can be configured to decouple a relationship between power (average and peak) and wavelength shift that may occur with conventional optical systems.

Embodiments of the system can further include combination of at least two of the output pulses from the nonlinear optical medium to generate at least one combined output pulse. Some embodiments can include generation of output pulses so that the center wavelength of each output pulse is the same as that of one or more other output pulses. The output pulse train exiting the nonlinear optical medium can then be combined into a combined output pulse that may be a single output pulse. This may facilitate generating a single combined output pulse from a plurality of output pulses with a scalable power and/or tunable wavelength.

Depending on the embodiment, the output can include output pulses exiting the nonlinear optical medium, the output can include combined output pulses exiting from a combination process, and/or the output can include a combination of both. The output may be used in a variety of nonlinear optical processes and systems, such as nonlinear optical imaging. Some embodiments of the system can be used to generate an output that may further be used as a pulse source for nonlinear optical process that can facilitate ease of alignment, design, and/or power scalability.

As disclosed herein, the incorporation of techniques of pulse division and/or pulse combination within the field of nonlinear optics can provide a means for managing otherwise excessive nonlinear phase accumulations, enabling pulses to produce greater powers than otherwise possible without degradation to pulse quality. The disclosed systems and methods of the pulse division to the solition self-frequency shift (SSFS) in an optical fiber can be achieved by dividing a parent pulse into N copies, and coupling these copies into a suitable length of optical fiber that can support soliton formation. In some embodiments, each pulse copy can be shifted in wavelength according to its input peak power. Using one-to-one mapping of the input peak power to the output wavelength, some embodiments can facilitate quick generation of a multiple-pulse output from a single parent pulse (controlled by the number of pulse divisions N), as well as the ability to broadly tune the wavelengths of these pulses by adjusting their input peak powers.

In at least one embodiment, an optical system can include at least one division stage configured to receive at least one parent pulse and divide the at least one parent pulse into at least two divided pulses. The system can include at least one nonlinear optical medium configured to receive the at least two divided pulses and generate an output pulse train comprising at least two output pulses. In some embodiments, a center wavelength of at least one output pulse is different from a center wavelength of a divided pulse.

Some embodiments can include a plurality of division stages. In some embodiments, the at least one division stage can be configured to cause each divided pulse to be temporally shifted relative to each other. In some embodiments, the at least one division stage can be configured to cause a polarization state of each divided pulse to be orthogonal to another divided pulse. Some embodiments can include at least one pump source to generate the parent pulse. Some embodiments can include at least one wave plate and/or at least one polarizing beam splitter configured to adjust the polarization and/or power of any one divided pulse. In some embodiments, the at least one nonlinear optical medium can be configured to support and sustain soliton formation for each divided pulse to generate a soliton self-frequency shifted output pulse. In some embodiments, at least one divided pulse can have a different power from at least one other divided pulse to produce output pulses of at least two different wavelengths. In some embodiments, a peak power of each of the at least two divided pulses can be adjusted to produce the at least two output pulses, each having an identical wavelength. In some embodiments, the at least two output pulses can be combined.

In some embodiments, the at least one nonlinear optical medium can behave as a parametric gain medium for each divided pulse to generate a signal pulse for each divided pulse, an idler pulse for each divided pulse, and a residual pump pulse for each divided pulse. In some embodiments, the signal pulses can be combined, and/or the idler pulses are combined, and/or the residual pump pulses are recombined.

In some embodiments, the at least one nonlinear optical medium can be one of an optical fiber and a nonlinear solid state medium. Some embodiments can include a feedback loop configured to cause an amount of at least one of the signal pulse and the idler pulse to be resynchronized with a subsequent parent pulse entering the at least one nonlinear optical medium. Some embodiments can include a filter and a wavelength division multiplexer. In some embodiments, the feedback loop can include a single mode fiber connected between the filter and the wavelength division multiplexer.

Some embodiments can include at least one combination stage configured to receive the output pulse train from the at least one nonlinear optical medium and cause the at least two output pulses of the output pulse train to combine into a combined output pulse. In some embodiments, the at least one combination stage is configured to compensate for temporal delay induced by birefringence. Some embodiments can include an information feedback loop to indicate whether temporal overlapping between the output pulses is occurring when generating the combined output pulse so as to introduce active stabilization.

Some embodiments can include a spectroscopy/imaging instrument in which the output pule train is used to provide a multi-color excitation source for the spectroscopy/imaging instrument.

In at least one embodiment, an optical system can include at least one division stage configured to receive at least one parent pulse and divide the at least one parent pulse into at least two divided pulses when the at least one parent pulse is propagating in a forward direction through the division stage. The system can include at least one nonlinear optical medium configured to receive the at least two divided pulses and generate an output pulse train comprising at least two output pulses. In some embodiments, a center wavelength of at least one output pulse can be different from a center wavelength of at least one divided pulse. In some embodiments, the system can be configured to direct the output pulse train from the at least one nonlinear optical medium to the at least one division stage so that the output pulse train propagates in a reverse direction through the at least one division stage to cause the at least two output pulses of the output pulse train to combine into a combined output pulse.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present innovation will be more apparent from the following more particular description thereof, presented in conjunction with the following drawings. Like reference numbers used in the drawings may identify like components.

FIGS. 12-13 may be obtained simultaneously in one scan by using an output generated from an embodiment of the system as the pulse source for imaging.

DETAILED DESCRIPTION OF THE INVENTION

The following description is of exemplary embodiments that are presently contemplated for carrying out the present invention. This description is not to be taken in a limiting sense, but is made merely for the purpose of describing the general principles and features of the present invention. The scope of the present invention is not limited by this description.

Figure 1:
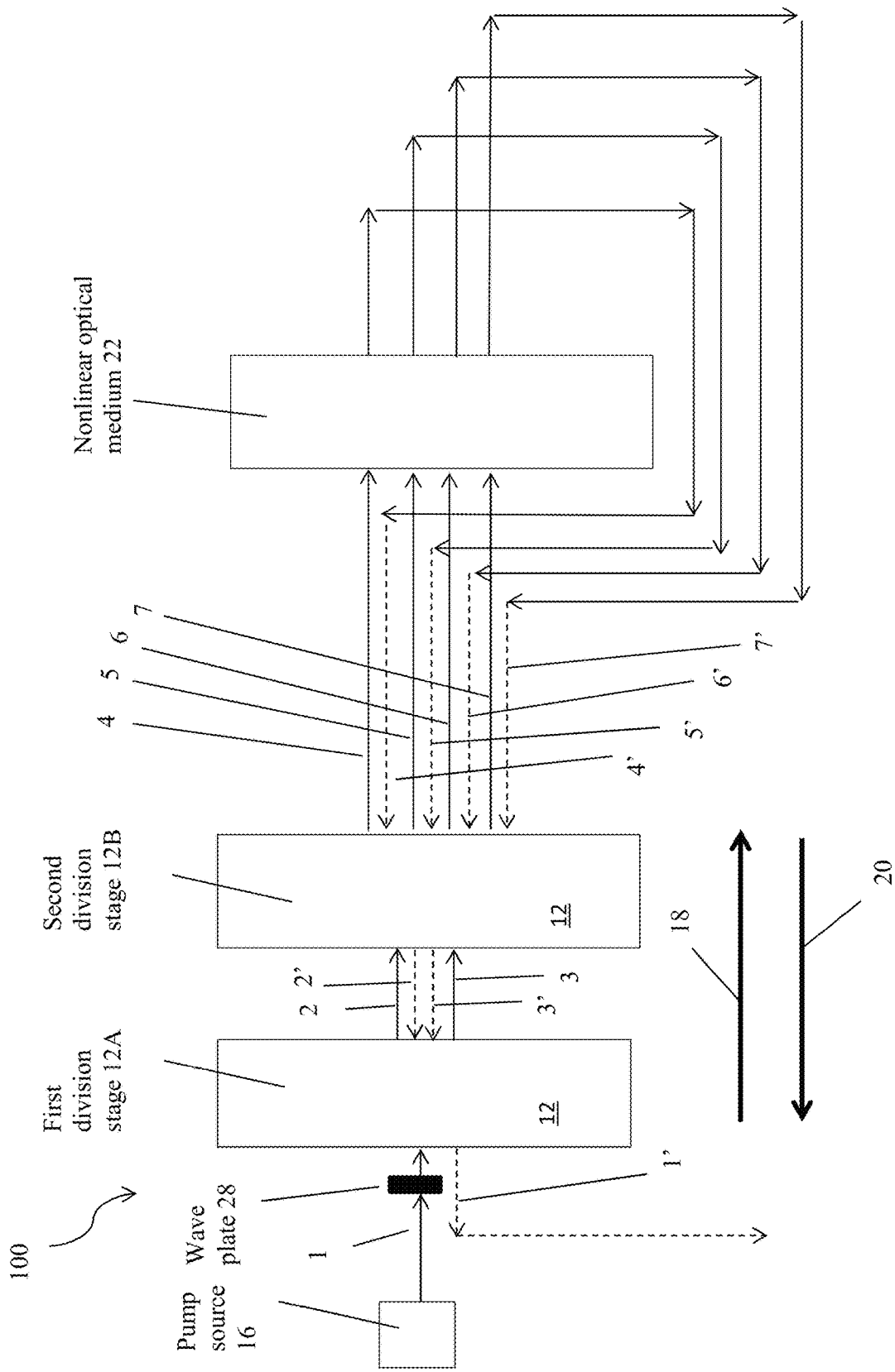
FIG. 1 shows an exemplary block diagram of an embodiment of the system 100 with an output pulse train being passed back through an embodiment of a division stage for combination of at least two output pulses.

FIG. 1 shows an exemplary block diagram of an embodiment of the system 100. The system 100 can include at least one division stage 12 configured to receive an input pulse and divide the input pulse into divided pulses. In some embodiments, each division stage 12 may divide each pulse received by that stage 12 into two divided pulses. Some embodiments can include more than one division stage 12. For example, a first division stage 12A can be arranged in series with a second division stage 12B. The first division stage 12A can be configured to receive a parent pulse. For example, a first forward pulse 1 may be generated from a pump source 16 to be directed into the first division stage 12A. The first forward pulse 1 can be the parent pulse. The first forward pulse 1 may enter the first division stage 12A in the forward direction 18. The first division stage 12A may divide the first forward pulse 1 into a second forward pulse 2 and a third forward pulse 3. The second forward pulse 2 may be separated temporally from the third forward pulse 3.

The second forward pulse 2 and the third forward pulse 3 can be directed from the first division stage 12A to the second division stage 12B. The second division stage 12B may divide the second forward pulse 2 into a fourth forward pulse 4 and a fifth forward pulse 5. The fourth forward pulse 4 may be separated temporally from the fifth forward pulse 5. The second division stage 12B may divide the third forward pulse 3 into a sixth forward pulse 6 and a seventh forward pulse 7. The sixth forward pulse 6 may be separated temporally from the seventh forward pulse 7. The division of the third forward pulse 3 can occur after the division of the second forward pulse 2. In embodiments where the third forward pulse 3 exits from the first divisional stage 12A before the second forward pulse 2 exits therefrom, the third forward pulse 3 may be divided prior to the second forward pulse 2.

More division stages 12 can be included. For example, a third division stage 12 may be added to receive the fourth forward pulse 4, the fifth forward pulse 5, the sixth forward pulse 6, and the seventh forward pulse 7, and dividing each received forward pulse into two additional divided pulses. As yet another example, a fourth divisional stage 12 could be added to receive the divided pulses from the third divisional stage for generating additional divided pulses. In some embodiments, the division of the received divided pulses for these additional divisional stages can be performed similarly to how the first and second division stages 12A and 12B are configured to operate.

The output from the division stages 12 can be referred to as a pulse train. For example, the pulse train from the first division stage 12A can include the second forward pulse 2 and the third forward pulse 3. The pulse train from the second division stage 12B can include the fourth forward pulse 4, the fifth forward pulse 5, the sixth forward pulse 6, and the seventh forward pulse 7. Each divided pulse of a pulse train can be separated in time. This may be achieved by introducing a path difference in the division stage 12 for each divided pulse. For example, the second forward pulse 2 can be separated in time from the third forward pulse 3. Additionally, the fourth forward pulse 4 can be separated in time from the fifth forward pulse 5. The fifth forward pulse 5 may be separated in time from the sixth forward pulse 6. The sixth forward pulse 6 may be separated in time from the seventh forward pulse 7.

Each divided pulse generated from a pulse entering the division stage 12 can exhibit a polarization state that is orthogonal to the other divided pulse generated from that input pulse (e.g. the polarizations may be perpendicular to each other such as one divided pulse may have an s-polarization and the other divided pulse may have a p polarization, etc.). For example, the second forward pulse 2 can have a polarization state that is orthogonal to the polarization state of the third forward pulse 3. The fourth forward pulse 4 can have a polarization that is orthogonal to the polarization state of the fifth forward pulse 5. The sixth forward pulse 6 can have a polarization state that is orthogonal to the polarization state of the seventh forward pulse 7.

The pulse train exiting a division stage 12 can be passed through a nonlinear optical medium 22. The nonlinear optical medium 22 may be an optical fiber 22 to generate a corresponding output pulse for each divided pulse. For example, with an embodiment of the system 100 having only a first division stage 12A, the second forward pulse 2 and the third forward pulse 3 can be passed through an optical fiber 22. With an embodiment of the system 100 having a first division stage 12A and a second division stage 12B, the fourth forward pulse 4, the fifth forward pulse 5, the sixth forward pulse 6, and the seventh forward pulse 7 can be passed through an optical fiber 22. The optical fiber 22 may be used to support and/or sustain soliton formation. For example, the plurality of divided pulses may be directed through the optical fiber 22 so that each divided pulse can generate a soliton as it propagates. In some embodiments, the optical fiber 22 can cause the pulses in the output pulse train to shift in center wavelength. For example, in embodiments with only two divided pulses, the output pulse corresponding to the second forward pulse 2 may have a center wavelength $\lambda_2$. The output pulse corresponding to the third forward pulse 3 may have a center wavelength $\lambda_3$. In embodiments where the second forward pulse 2 and the third forward pulse 3 are caused to enter the optical fiber 22, the center wavelength $\lambda_2$ of the output pulse exiting the optical fiber 22 generated by the second forward pulse 2 may be different from center wavelength of the second forward pulse 2 entering the optical fiber 22, which may be due to the shift caused by optical fiber 22. The shift in center wavelengths for each divided pulse can be controlled individually.

In embodiments with four divided pulses, the output pulse corresponding to the fourth forward pulse 4 may have a center wavelength $\lambda_4$. The output pulse corresponding to the fifth forward pulse 5 may have a center wavelength $\lambda_5$. The output pulse corresponding to the sixth forward pulse 6 may have a center wavelength $\lambda_6$. The output pulse corresponding to the seventh forward pulse 7 may have a center wavelength $\lambda_7$. In embodiments where the fourth forward pulse 4, the fifth forward pulse 5, the sixth forward pulse 6, and the seventh forward pulse 7 are caused to enter the optical fiber 22, the center wavelength of these pulses entering the optical fiber 22 may be different from the center wavelengths $\lambda_4$, $\lambda_5$, $\lambda_6$, and $\lambda_7$ of the corresponding output pulses exiting the optical fiber 22. The shift in center wavelengths for each output pulse can be controlled individually.

As noted above, the pulses exiting a division stage can be referred to as divided pulses. A plurality of divided pulses may be referred to as a pulse train. The pulses exiting a nonlinear optical medium 22 can be referred to as output pulses. A plurality of output pulses may be referred to as an output pulse train. As will be explained later, the system 100 may also include a combination stage 14 through which the output pulse train can be caused to pass through or the system 100 may be configured to redirect the output pulse train back through a division stage 12 in reverse direction. Embodiments of the combination stage 14 can combine at least two output pulses of the output pulse train to generate at least one combined output pulse. Embodiments of the system 100 that redirect the output pulse train back through the division stage in reverse direction can also combine at least two output pulses of the output pulse train to generate at least one combined output pulse. A combined output pulse also can be used as an output for the system 100. The output from the system 100 can be directed out of the system 100. The output may be used in a particular type of application (e.g. directing into a body of some type for detection purposes, imaging applications, etc.). In some embodiments, the system 100 can be a component of a device for the particular type of application. For example, the system 100 can be a pulse source component that may be used to produce an imaging device, a detection device, etc.

Embodiments of the system 100 may include at least one wave plate 28. Each wave plate 28 can be configured to alter a polarization state of a parent pulse, a divided pulse, a pulse train, an output pulse train, a combined output pulse, and/or an output. In at least one embodiment, the wave plate 28 can be placed before any one of the division stages 12. This may be done to control a power ratio between the divided pulses. For example, a wave plate 28 positioned before the first division stage 12A can be used to adjust a power ratio between the second forward pulse 2 and the third forward pulse 3. A wave plate 28 positioned between the first division stage 12A and the second division stage 12B can be used to adjust a power ratio between the fourth forward pulse 4 and the fifth forward pulse 5, and the sixth forward pulse 6 and the seventh forward pulse 7. A wave plate 28 positioned after the second division stage 12B between the second division stage 12B and the optical fiber 22 can be used to adjust the polarization state of the pulse train such that the polarization axes are aligned to coincide with one of the principal axes of the optical fiber.

Adjusting the wave plates 28 can facilitate power scaling at least one output pulse. For example, a divided pulse may have a vertical polarization state while another divided pulse may have a horizontal polarization state. The wave plate 28 may be rotated to transfer power between the horizontal polarized divided pulse and the vertical polarized divided pulse, for example. This may be done before the pulse train is caused to enter the optical fiber 22. In some embodiments, the system 100 can adjust the power of the output. For example, an output can include a plurality of output pulses (either having a same or different center wavelength relative to each other). The peak power of each divided pulse can be adjusted via the wave plates 28 to adjust the center wavelength of each corresponding output pulse. This may facilitate generating an output with a plurality of output pulses with scalable power, tunable wavelength, and/or dual polarization.

Adjusting the wave plates 28 can further facilitate tuning the center wavelength of at least one output pulse to form a tuned wavelength. The tuned wavelength for each output pulse can be adjusted to be the same. For example, with a two division stage 12 configuration, the tuned wavelength of the output pulse corresponding to the fourth forward pulse 4 can be made equal to, or at least approximately equal to, the tuned wavelength of the output pulse corresponding to the fifth forward pulse 5. The tuned wavelength of the output pulse corresponding to the sixth forward pulse 6 can be made equal to, or at least approximately equal to, the tuned wavelength of the output pulse corresponding to the seventh forward pulse 7. In some embodiments, tuned wavelengths of the output pulses corresponding to the fourth forward pulse 4, the fifth forward pulse 5, the sixth forward pulse 6, and the seventh forward pulse 7 can be made equal to, or approximately equal to each other. This may facilitate generating a single-color output. For example, an output can include the output pulses corresponding to the forth forward pulse 4, the fifth forward pulse 5, the sixth forward pulse 6, and the seventh forward pulse 7, each with a same, or approximately the same, center wavelength.

In some embodiments, the center wavelengths of each output pulse can be tuned to exhibit a center wavelength that is different from a center wavelength of another output pulse. This may facilitate generating a multi-color output. For example, an output can include the output pulses corresponding to the forth forward pulse 4, the fifth forward pulse 5, the sixth forward pulse 6, and the seventh forward pulse 7, each with a different center wavelength.

In some embodiments, the output pulse train from the optical fiber 22 can be directed back through the division stages 12. This may be done to combine at least two output pulses to form at least one combined output pulse. For example, with an embodiment of the system 100 having a first division stage 12A and a second division stage 12B, the output pulses of the output pulse train exiting the optical fiber 22 can enter the second division stage 12B in reverse direction 20 so that the fourth 4, fifth 5, sixth 6, and seventh 7 forward pulses correspond to a fourth reverse pulse 4', a fifth reverse pulse 5', a sixth reverse pulse 6', and seventh reverse pulse 7' out of the optical fiber 22 to propagate through the second division stage 12B and then the first division stage 12A prior to generating a single combined output pulse. FIG. 1 shows the forward pulses as solid arrows and reverse pulses as dashed arrows.

The second division stage 12B can combine the fourth reverse pulse 4' and the fifth reverse pulse 5' into a second reverse pulse 2'. The second division stage 12B can further combine the sixth reverse pulse 6' and the seventh reverse pulse 7' into a third reverse pulse 3'. The third reverse pulse 3' and the second reverse pulse 2' can be directed into the first division stage 12A in reverse direction 20. The first division stage 12A can combine the third reverse pulse 3' and the second reverse pulse 2' into a first reverse pulse 1'. In some embodiments, the first reverse pulse 1' can be the output. The output can be directed out of the system 100 and/or this output can be configured for use in a particular type of application (e.g. directing the pulse into a body for detection or imaging purposes, etc.).

The combined output pulse can have a peak power that is the sum of the peak powers of the two output pulses that were combined. For example, the third reverse pulse 3' can have a peak power that is the sum of the peak powers of the sixth reverse pulse 6' and the seventh reverse pulse 7'. The second reverse pulse 2' can have a peak power that is the sum of the peak powers of the fourth reverse pulse 4' and the fifth reverse pulse 5'. The first reverse pulse 1' can have a peak power that is the sum of the peak powers of the second reverse pulse 2' and the third reverse pulse 3'.

Figure 2:
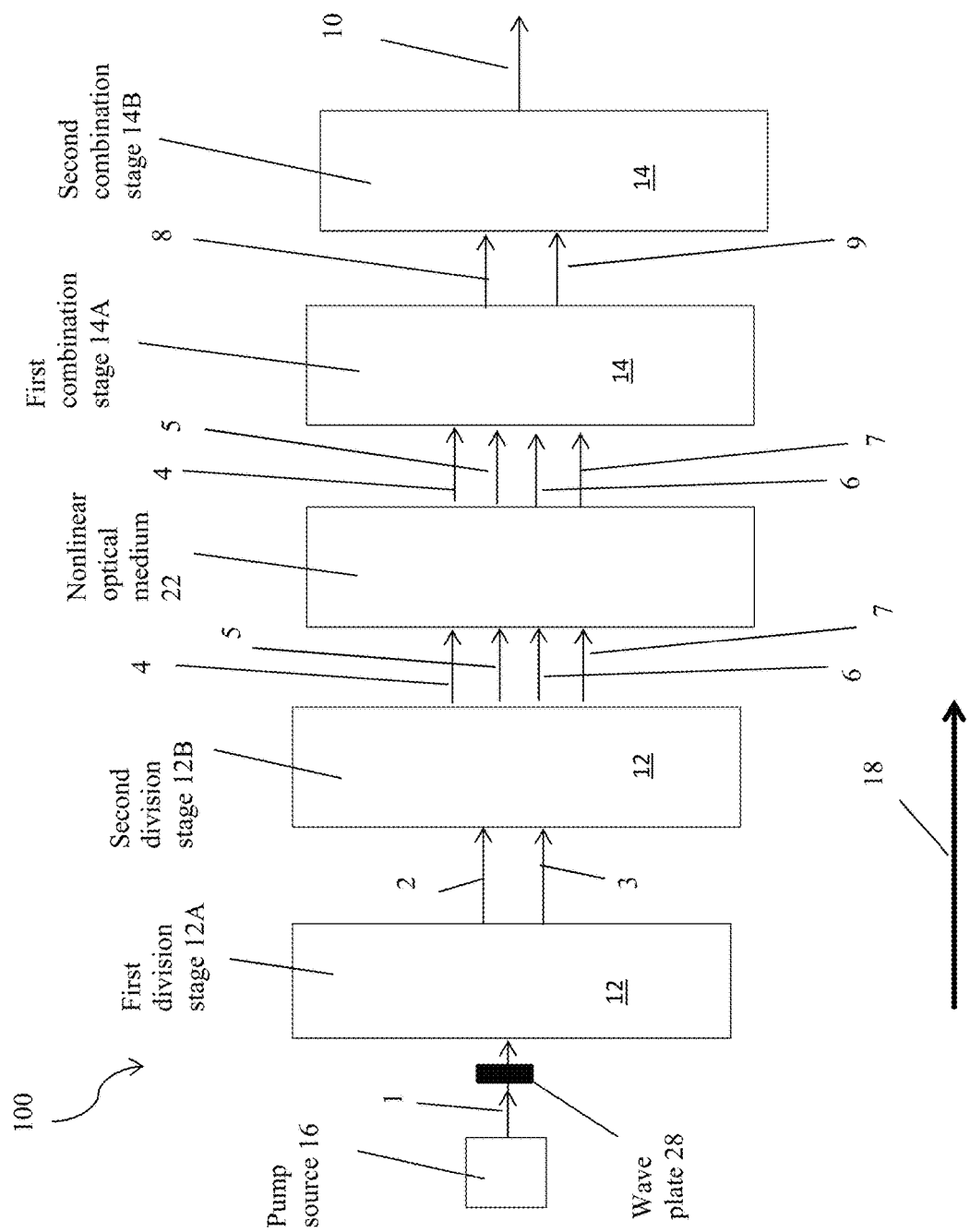
FIG. 2 shows an exemplary block diagram of an embodiment of the system 100 with an input pulse being passed through an embodiment of division stage and a nonlinear optical medium, and the resulted output pulse train being passed through an embodiment of a combination stage for combination of at least two output pulses.
Figure 3:
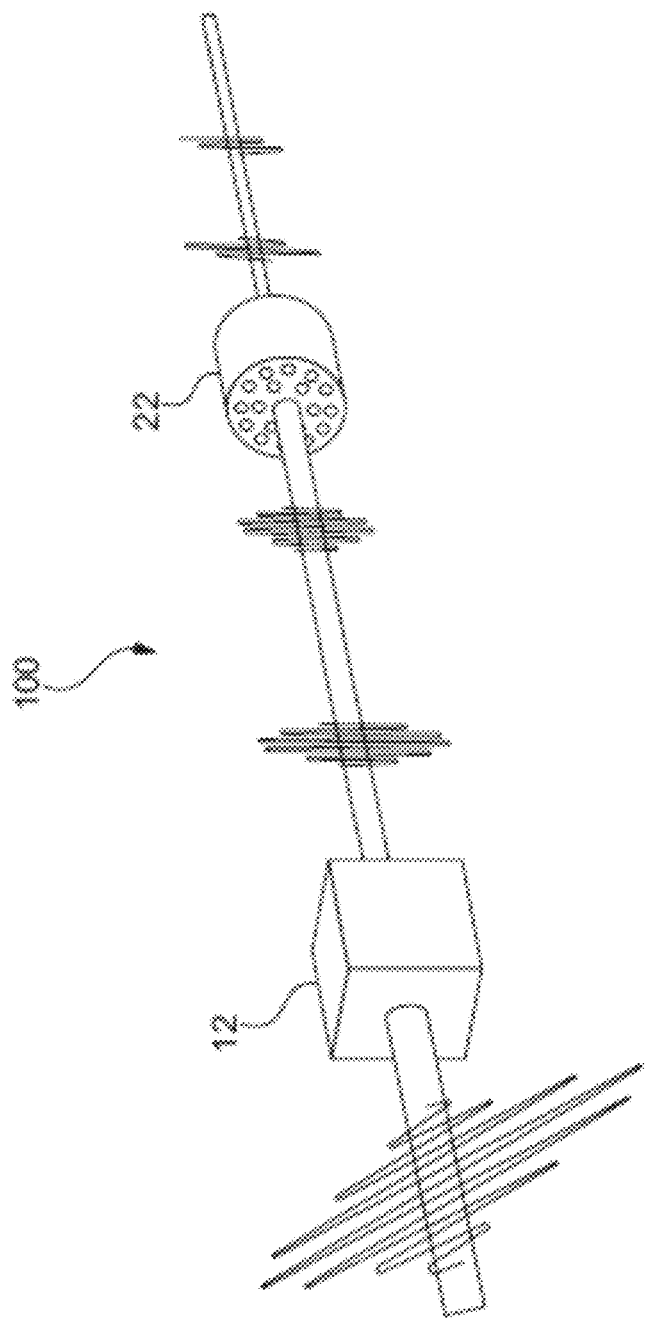
FIG. 3 depicts and embodiment of the system showing an exemplary input pulse being directed through the system.
Figure 4:
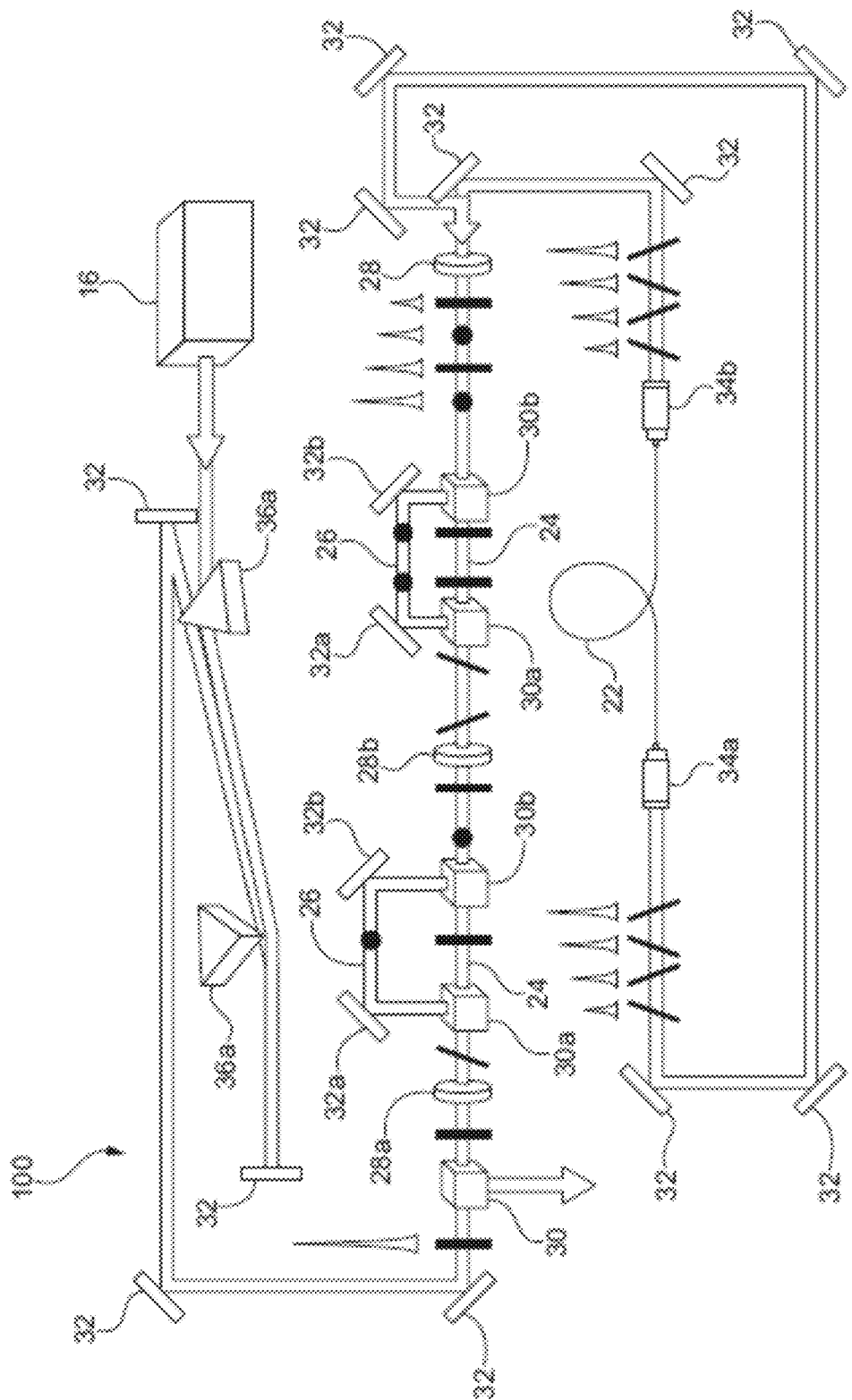
FIG. 4 is an exemplary architecture of an embodiment of the system shown in FIG. 1 that may be configured to pass an output pulse train back through an embodiment of a division stage for combination of at least two output pulses.

Referring to FIG. 2, in some embodiments, the system 100 can direct the pulse train produced from the last divisional stage of a plurality of divisional stages 12 to an optical medium 22 for nonlinear optical source generation, such as an optical fiber. While various embodiments may show an optical fiber 22 as the optical medium for nonlinear optical source generation, it should be noted that other optical mediums can be used. The optical fiber 22 may be configured to cause the output pulse train exiting therefrom to be directed into a combination stage 14 as an alternative to reversing the flow of output pulse train back through the divisional stages 12. For example, the system 100 can include at least one combination stage 14 configured to receive the output pulse train from the fiber 22 to combine at least two output pulses of the output pulse train to generate at least one combined output pulse. With embodiments of the system 12 that have only one division stage 12, the system 100 may only have one combination stage 14. However, more than one combination stage 14 may be used even with one division stage 12. With embodiments of the system 100 having a first division stage 12A and the second division stage 12B, the system 100 may include a first combination stage 14A and a second combination stage 14B. The first combination stage 14A may be arranged in series with the second combination stage 14B. The first combination stage 14A can be configured to receive the output pulse train exiting the optical fiber 22. The first combination stage 14A can combine the output pulse corresponding to the fourth forward pulse 4 and the output pulse corresponding to the fifth forward pulse 5 into an output pulse 8. The first combination stage 14A can further combine the output pulse corresponding to the sixth forward pulse 6 and the output pulse corresponding to the seventh forward pulse 7 into an output pulse 9. The output pulse 8 and the output pulse 9 can be directed through the second combination stage 14B. The second combination stage 14B can combine the output pulse 8 and the output pulse 9 into an output pulse 10. In some embodiments, the output pulse 10 can be the output. The output can be directed out of the system 100 and/or this output can be configured for use in a particular type of application (e.g. directing the pulse into a body for detection or imaging purposes, etc.).

A nonlinear optical medium 22 can be configured to generate an output pulse train including at least one corresponding output pulse for each divided pulse that enters the nonlinear optical medium 22, where a center wavelength of at least one of the output pulses can differ from a center wavelength of at least one of the divided pulses that entered the nonlinear optical medium 22. As noted above, the center wavelengths of at least one of the output pulses can be tuned. In embodiments where the nonlinear optical medium 22 supports and sustains soliton self-frequency shift effects, thereby causing an output pulse center wavelength to differ from the center wavelength of its corresponding divided pulse, the peak power of each divided pulse can be adjusted via the wave plates 28, or by using neutral density filters, or by other means that can adjust the power. Adjusting the peak powers of divided pulses can further facilitate adjusting the center wavelengths of any of the output pulses. Thus, embodiments of the system 100 can allow for generating an output with a plurality of output pulses with scalable power, tunable wavelength, and/or dual polarization.

As noted above, the optical fiber 22 can facilitate generating an output pulse train including output pulses, any one of which may have a center wavelength that differs from a center wavelength of its corresponding divided pulse. In some embodiments, each output pulse can have a center wavelength that differs from a center wavelength of its corresponding divided pulse. In some embodiments, the difference in center wavelength between an output pulse and its corresponding divided pulse can be the same as the difference in center wavelength between any other output pulse and its corresponding divided pulse. In some embodiments, the change in center wavelength may be due to intra-band stimulated Raman scattering, i.e., soliton self-frequency shifting.

In some embodiments, one-to-one mapping of peak power of each divided pulse to output wavelength of each corresponding output pulse can facilitate generating a multiple-color output from a single parent pulse. For example, in some embodiments, the system 100 can be configured to generate a pulse train including N divided pulses of distinct peak powers. Each divided pulse may undergo soliton self frequency shift respectively to produce an output pulse train comprising a plurality of corresponding output pulses, each output pulse being at a separate and distinct center wavelength from each other. The output pulse train can be used to generate an N-color output (e.g., an output having a plurality of output pulses, each output pulse with a separate and distinct center wavelength).

One-to-one mapping of peak power of each divided pulse to output wavelength of each corresponding output pulse can also facilitate generating a single-color output from a single parent pulse. For example, in some embodiments, the system 100 can be configured to generate a pulse train including N divided pulses of identical peak powers. Each divided pulse may undergo soliton self frequency shift respectively to produce an output pulse train comprising a plurality of corresponding output pulses, each output pulse being at the same, or approximately the same, center wavelength as each other output pulse. The output pulse train is therefore a single-color output (e.g., an output having a plurality of output pulses, each output pulse with a center wavelength that is the same or approximately the same as each other output pulse). In some embodiments, generating an output pulse train with a plurality of output pulses having the same, or approximately the same, center wavelength can be achieved by tuning the system 100. The single-color output may subsequently be combined to produce an output of higher peak and average power than otherwise possible with an undivided pulse being caused to travel through the optical fiber 22. For example, a single-color output comprising a plurality of output pulses having the same center wavelength can be caused to enter a combination process by which at least one combined output pulse can be generated as the output.

In some embodiments, the input pulse train can include divided pulses of varied peak powers, among which some divided pulses can have identical peak powers and some can have different peak powers. The multiple-color output from such a configuration may be controlled by the peak powers of the constituent divided pulses.

With conventional optical systems, there can be a fixed relationship between achievable peak power of a soliton self-frequency shift output pulse and the wavelength of the pulse. For example, with conventional non-linear optical systems, adjusting the output power can cause an undesirable shift in wavelength of a soliton self-frequency shift output pulse. Embodiments of inventive system 100, however, can effectively decouple the achievable wavelength shift from the final average and peak power of the output pulse.

In some implementations, embodiments of the system 100 can direct the output for use in additional applications. In some implementations, embodiments of the system 100 can be used as a component of the application. For example, the output can be used in polarization multiplexing imaging. For instance, different polarization states of the output pulses of an output can be encoded. The output may be used as an excitation beam and be directed towards a sample (e.g., a crystal having alternating domains). The output may then be utilized to perform dual-polarization second harmonic (SHG) imaging, for example. Raster scanning of the sample may be performed. Observation of a particular domain can be dependent on the polarization state of the excitation beam. By examining the SHG signal, polarized SHG images at both polarization states can be obtained simultaneously in one scan.

As noted above, for conventional soliton self-frequency shift optical systems, adjusting the power may generate an undesired shift in wavelength of the excitation beam. Yet, use of the output for an excitation beam in optical imaging can benefit from the power scalability and tunable nature of an embodiment of the system 100 generating the output. For example, the power of the output can be increased by adding more pulse division/combination stages. The wavelength of the output pulses can be adjusted by adjusting the peak powers of the corresponding divided pulses, such as by rotation of the wave plate 28.

The output can also be used as excitation sources for nonlinear optical imaging, spectroscopy, sensing applications, etc. In some embodiments, a multi-color output pulse can be used for multi-photon imaging to simultaneously excite multiple fluorescent markers. For example, each fluorescent marker may be optimally excited by one or more output pulses in the output that is/are centered at an optimal center wavelength. In some embodiments, a multi-color output can be used for coherent Raman imaging or spectroscopy. For example, the multi-color output can provide the pump, Stokes, and anti-Stokes (if necessary) pulses at desired wavelengths. In some embodiments, the multi-color output can be used for holographic nonlinear optical imaging. For example, the multi-color output can provide relevant pulses at desired wavelengths needed for nonlinear optical signal generation, and the reference pulses at desired wavelength for interferometric detection.

For example, some embodiments of the system 100 may facilitate power scaling pulses undergoing intraband Raman scattering or soliton self-frequency shifting. The power scaling can be performed while also tuning the center wavelengths of each output pulse. With some practical applications, the relationship between the output pulse characteristics (e.g., wavelength, power) and the peak power of the input pulse, the spectral width of the input pulse, and/or the length of the optical fiber 22 may be fixed. Such relation can hinder conventional nonlinear optical devices by creating a fixed relationship between the achievable output power and center wavelength of a soliton self-frequency shifted pulse. For example, with conventional soliton self frequency shift systems, adjusting the output power can cause an undesirable shift in the center wavelength of the output pulse. Embodiments of inventive system 100, however, can effectively decouple the achievable wavelength shift from the final average and peak power of the output pulse. Specifically, if N divided pulses are generated from an individual parent pulse by an embodiment of the system 100 and caused to pass through the optical fiber 22 to undergo soliton self frequency shift, an output pulse train having N output pulses that are each shifted in wavelength by the same amount can be generated. Combination of these N output pulses can result in a single output at the same wavelength with an average and peak power N times greater than otherwise achievable by merely passing an individual undivided pulse through the same length of optical fiber 22 in a conventional configuration Referring to FIGS. 1-5, an embodiment of the system 100 may include at least one pump source 16 used to generate the first forward pulse 1. The pump source 16 can be further configured to direct the first forward pulse 1 into the division stage 12. The pump source 16 may be a laser, but other pump sources 16 that can be used. An example of a pump source 16 may be a Ti: Sapphire laser configured to operate to emit light within a wavelength range from 650 nanometers (nm) to 1100 nm. For example, a pump source can generate light with a 30 femtosecond (fs) pulse duration, a central wavelength of approximately 845 nm, an average output power of approximately 670 milliWatts (mW), and a repetition rate of 87 MegaHertz (MHz). Other pump sources 16 and operating parameters can be used in other embodiments.

As previously mentioned, embodiments of the system 100 can include a first division stage 12A. The first division stage 12A can be configured to receive the first forward pulse 1 from the pump source 16. In some embodiments, the first division stage 12A can include at least two polarizing beam splitters 30A, 30B. The polarization beam splitter 30A, 30B can be a birefringent crystal or a polarization beam splitter cube. In at least one embodiment, each polarization beam splitter 30A, 30B can be a broad-band coated (e.g., from 800-1550 nm) polarizing beam splitter cube. An arrangement of polarizing beam splitters 30A, 30B can be configured to generate the second forward pulse 2 and the third forward pulse 3 from the first forward pulse 1. In some implementations, the polarizing beam splitters 30 can be arranged as a Mach-Zehnder interferometer configuration. Other configurations may be used in other embodiments.

In one embodiment, the first forward pulse 1 can be caused to enter a first polarizing beam splitter 30A arranged in series with a second polarizing beam splitter 30B. The first polarizing beam splitter 30A can split the first forward pulse 1 into the second forward pulse 2 so as to pass through a first arm path 24, and the third forward pulse 3 so as to pass through a second arm path 26. The first arm path 24 can be a direct path between the first polarizing beam splitter 30A and the second polarizing beam splitter 30B. The second arm path 26 can be a stepped path between the first polarizing beam splitter 30A and the second polarizing beam splitter 30B. The stepped path can include the first polarizing beam splitter 30A directing the third forward pulse 3 90-degrees to extend perpendicularly away from the second forward pulse 2, then a first mirror 32A directing the third forward pulse 3 90-degrees to run parallel with the second forward pulse 2, then a second mirror 32B directing the third forward pulse 3 90-degrees to run perpendicularly toward the second forward pulse 2 so as to meet with the second forward pulse 2 at the second polarizing beam splitter 30B, then the second polarizing beam splitter 30B directing the third forward pulse 90-degrees to extend parallel with the second forward pulse 2. Other first arm path 24 and/or second arm path 26 configurations can be used. This may include directing the third forward pulse 3 at different angles away from and towards the second forward pulse 2. For example, the third forward pulse 3 may be directed at an oblique angle (e.g., 45-degree angle) away from the second forward pulse 2, and then back towards the path of the second forward pulse 2 (e.g., 90-degree angle), and then directed (e.g., 45-degrees) to run parallel with the second forward pulse 2. Other angles and number of directional changes can be used.

In one implementation, a difference in path length can be generated between the first arm path 24 length and the second arm path 26 length of the first division stage 12A. This may be done to cause the second forward pulse 2 to shift in time relative to the third forward pulse 3. The difference in path length can be 100 millimeters (mm), for example. This may generate a shift in time between the second forward pulse 2 and the third forward pulse 3 so that they are separated by a pre-selected time shift. The pre-selected time shift can be 333 picoseconds (ps), 100 picoseconds, or some other pre-selected time shift value desirable to meet a particular set of design criteria, for example. The second forward pulse 2 can have a polarization state that is orthogonal to the polarization state of the third forward pulse 3.

The first division stage 12A can further include at least one wave plate 28B. The wave plate 28B can be configured to alter a polarization state of the second forward pulse 2 and the third forward pulse 3. The wave plate 28B can be an achromatic broadband anti-reflective coated wave plate. The wave plate 28B can be configured as a half-wave plate (e.g., configured to rotate polarization direction of linearly polarized light).

In some embodiments, a preceding half-wave plate 28A can be placed in front of the first polarizing beam splitter 30A so that the first forward pulse 1 passes through the preceding half-wave plate 28A before being made incident upon the first polarizing beam splitter 30A. The preceding half-wave plate 28A may be used to control the power ratio between the second forward pulse 2 and the third forward pulse 3. A following half-wave plate 28B can be placed after the second polarizing beam splitter 30B so that each the second forward pulse 2 and the third forward pulse 3 pass through the following half-wave plate 28B after exiting the second polarizing beam splitter 30B. The following half-wave plate 28B may be used to rotate the polarization states of the second forward pulse 2 and the third forward pulse 3. Rotating the polarization states may be done before the second forward pulse 2 and the third forward pulse 3 are caused to enter a second division stage 12B.

In the drawings, a pulse with a vertical, or an out of plane, polarization state may be depicted by a dot. A pulse with a horizontal, or an in plane, polarization state may be depicted with a vertical arrow. A pulse with a 45-degree polarization state relative the horizontal or vertical polarization states may be represented by a tilted arrow.

As previously mentioned, the system 100 can include a second division stage 12B. The second division stage 12B can be configured to receive the second forward pulse 2 and the third forward pulse 3 from the first division stage 12A. The second division stage 12B can be configured the same as or similar to the first division stage 12A. For example, second division stage 12B can include at least two polarizing beam splitters 30A, 30B. The polarizing beam splitters 30A, 30B can be configured to generate two dived pulses from each of the second forward pulse 2 and the third forward pulse 3.

The second forward pulse 2 and the third forward pulse 3 can be caused to enter a first polarizing beam splitter 30A arranged in series with a second polarizing beam splitter 30B. Due to the time shift between the second and third forward pulses 2 and 3, these pulses may be fed into the second division 12B stage in series at different times. The first polarizing beam splitter 30A can split the second forward pulse 2 into the fourth forward pulse 4 to be directed to a first arm path 24 and the fifth forward pulse 5 to be directed toward a second arm path 26. The first polarizing beam splitter 30A can further split the third forward pulse 3 into the sixth forward pulse 6 to be directed to the first arm path 24 and the seventh forward pulse 7 to be directed toward the second arm path 26. The first arm path 24 can be a direct path between the first polarizing beam splitter 30A and the second polarizing beam splitter 30B. The second arm path 26 can be a stepped path between the first polarizing beam splitter 30A and the second polarizing beam splitter 30B. The stepped path can include the first polarizing beam splitter 30A directing the fifth forward pulse 5 and the seventh forward pulse 7 90-degrees to extend perpendicularly away from the path of travel of the fourth forward pulse 4 and the sixth forward pulse 6, then a first mirror 32A directing the fifth forward pulse 5 and the seventh forward pulse 7 90-degrees to run parallel with the fourth forward pulse 4 and the sixth forward pulse 6, then a second mirror 32B directing the fifth forward pulse 5 and the seventh forward pulse 7 90-degrees to run perpendicularly toward the path of travel of the fourth forward pulse 4 and the sixth forward pulse 6 so as to pass through the second polarizing beam splitter 30B. The second polarizing beam splitter 30B can direct the fifth forward pulse 5 and the seventh forward pulse 7 90-degrees to extend parallel with the direction of travel of the fourth forward pulse 4 and the sixth forward pulse 6. Other first arm path 24 and/or second arm path 26 configurations can be used to provide a pre-selected time delay between different pulses or to affect other parameters of the pulses to meet a desired set of design criteria. This can include other angles and number of directional changes.

In one implementation, a difference in path length can be generated between the first arm path 24 and the second arm path 26 in the second division stage 12B. This may be done to cause the fourth forward pulse to shift in time relative to the fifth forward pulse 5 and to cause the sixth forward pulse 6 to shift in time relative to the seventh forward pulse 7. The difference in path length can be 50 mm or some other pre-selected distance, for example. This may help generate a shift in time between the fourth forward pulse 4, the fifth forward pulse 5, the sixth forward pulse 6, and the seventh forward pulse 7 so that they are separated by a pre-selected time shift. The pre-selected time shift can be 167 ps or some other pre-selected time shift, for example. The fourth forward pulse 4, the fifth forward pulse 5, the sixth forward pulse 6, and the seventh forward pulse 7 can exhibit alternating vertical and horizontal polarization states.

The second division stage 12B can further include at least one wave plate 28. The second stage 12B can include a following half-wave plate 28B placed after the second polarizing beam splitter 30B so that each of the fourth forward pulse 4, the fifth forward pulse 5, the sixth forward pulse 6, and the seventh forward pulse 7 may pass through the following half-wave plate 28B after exiting the second polarizing beam splitter 30B.

The energy of a divided pulse entering a division stage 12 can be varied through adjustment of the preceding half-wave plate 28. For example, rotating the half-wave plate 28 controlling the ratio of pulse splitting (e.g., the preceding half-wave plate 28A for the first stage 12A, or similarly the preceding half-wave plate 28B for the second stage 12B) can adjust the power or amplitude of the second forward pulse 2 and the third forward pulse 3 before entering the second stage 12B.

In some embodiments, a polarization beam splitter cube, as opposed to a birefringent crystal, may be used to allow the overall temporal separation between divided pulses to be determined by the path length through air rather than a dielectric material. The index of refraction for free space propagation can be wavelength independent, and thus use of a polarization beam splitter cube may cause the path length between divided pulses to be wavelength independent.

The system 100 can further include at least one optical fiber 22. The optical fiber 22 can be configured to receive a pulse train. For example, the pulse train generated by the division stage 12 can be passed into the optical fiber 22. This can be achieved via a first objective lens 34A focusing the pulse train into the optical fiber 22. The system 100 may include a 40× first objective lens 34A or other type of objective lens. A second objective lens 34B may be used for collimating the output pulse train exiting from the optical fiber 22. The second objective lens 34B can also be a 40× objective lens or other type of objective lens. The optical fiber 22 may be configured to support and sustain soliton formation. This may be achieved by utilizing a length of photonic crystal fiber 22 based on pulse parameters (e.g., pulse width, energy, and center wavelength), as soliton formation may be a function of pulse parameters. For example, in some embodiments the optical fiber 22 can be a 1.8 meter long nonlinear photonic crystal fiber (e.g., NL PM-750) with a zero-dispersion wavelength of 750 nm for soliton self-frequency shifting in embodiments where a Ti:Sapphire laser is used as a pump source 16 to emit light with a 30 fs pulse duration, a central wavelength of approximately 845 nm, an average output power of approximately 670 mW, and a repetition rate of 87 MHz. Other types of optical fiber 22 having different dimensions and properties may also be used to meet a particular set of design criteria.

Some embodiments can be configured to direct the output pulse train through the division stages 12A, 12B in reverse to achieve the combination of the at least two output pulses. For example, the output pulse train can be caused to pass through the second division stage 12B in the reverse direction 20. For instance, the fourth reverse pulse 4' (the output pulse corresponding to the $4^{th}$ forward pulse) and the sixth reverse pulse 6' (the output pulse corresponding to the $6^{th}$ forward pulse) can pass through the second arm path 26 in the reverse direction 20. The fifth reverse pulse 5' (the output pulse corresponding to the $5^{th}$ forward pulse) and the seventh reverse pulse 7' (the output pulse corresponding to the $7^{th}$ forward pulse) can pass through the first arm path 24 in the reverse direction 20. Upon the fourth reverse pulse 4' and the fifth reverse pulse 5' meeting at the first polarizing beam splitter 30A, the fourth reverse pulse 4' and the fifth reverse pulse 5' may be caused to constructively interfere and collimate to generate the second reverse pulse 2'. Further, upon the sixth reverse pulse 6' and the seventh reverse pulse 7' meeting at the first polarizing beam splitter 30A, the sixth reverse pulse 6' and the seventh reverse pulse 7' may be caused to constructively interfere and collimate to generate the third reverse pulse 3'.

The output pulse train can then pass through the first division stage 12A in reverse direction 20. For instance, the second reverse pulse 2' can pass through the second arm path 26 in the reverse direction 20. The third reverse pulse 3' can pass through the first arm path 24 in the reverse direction 20. Upon the second reverse pulse 2' meeting with the third reverse pulse 3' at the first polarizing beam splitter 30A, the second reverse pulse 2' and the third reverse pulse 3' may be caused to constructively interfere and collimate to generate the first reverse pulse 1'. The first reverse pulse 1' can be made to divert out of the system 100 by a polarization beam splitter 30 and be used as the output.

In some embodiments, the polarization of each output pulse may be rotated 90-degrees (i.e., the alternating linear polarization states of each output pulse may be exchanged) before the output pulse train enters the second division stage 12B and the first division stage 12A in the reverse direction 20. The can be achieved by passing the output pulse train through a half wave plate 28, or a polarization-rotation periscope, or any other means that can rotate the polarization by 90-degrees, before entering the division stage 12 in reverse direction 20.

Temporal delay of the output pulses within the output pulse train can be induced via fiber birefringence, which may be an undesired temporal delay. The refractive index of a medium that a pulse propagates through may depend on the polarization state of the pulse, which may lead to the temporal delay between pulses with different polarization states. The undesired temporal delay can be compensated for by using an additional combination stage 14, which, in some embodiments can be similar to a division stage 12 by including a pair of polarizing beam splitters 30. The two arm lengths 24, 26 of the combination stage 14 can be adjusted to compensate for the undesired temporal delay between the two perpendicular polarization axes.

Figure 5:
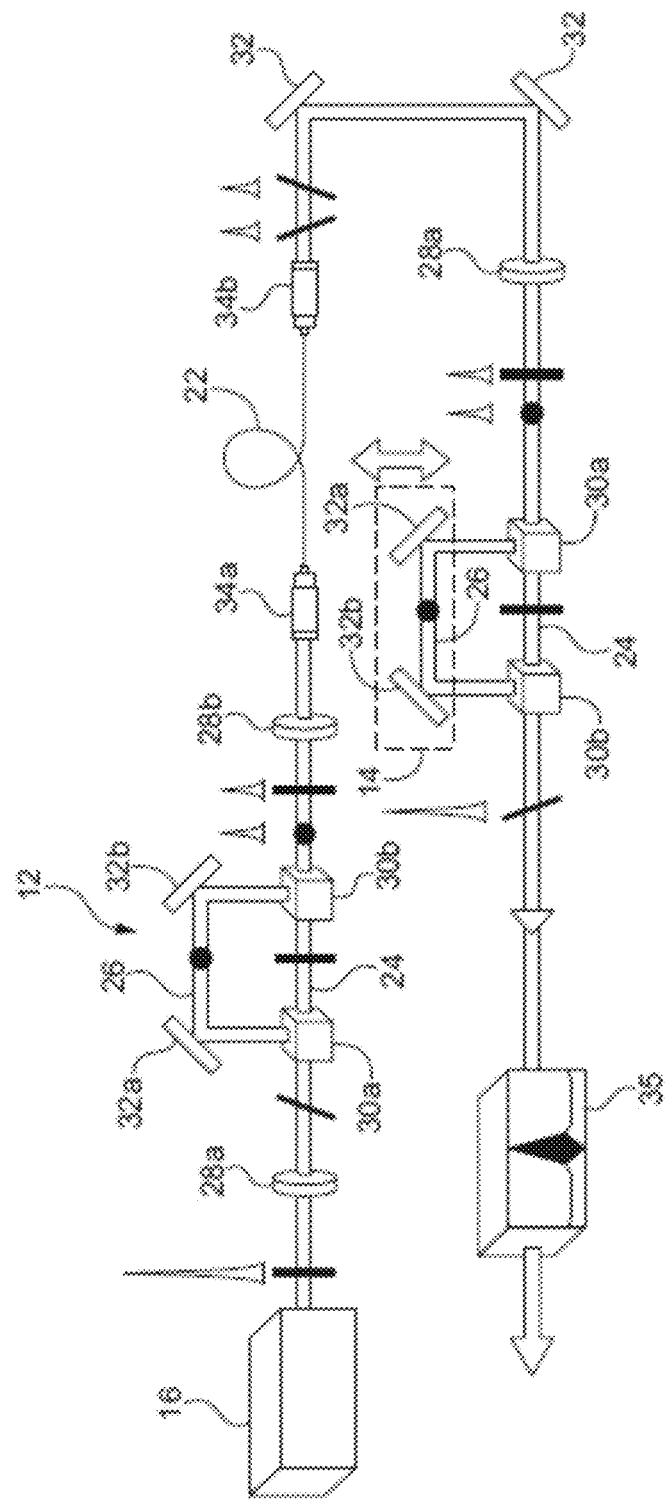
FIG. 5 is an exemplary architecture of an embodiment of the system that may utilize at least one combination stage that may be configured to pass an output pulse train through at least one combination stage for combination of at least two output pulses.

In some embodiments, the system 100 may be configured to direct the output pulse train exiting the optical fiber 22 to a combination stage 14 as opposed to causing the output pulse train to be passed through the division stages 12 in reverse direction 20. FIG. 5 shows an embodiment of a combination stage 14. The combination stage 14 can be configured to receive the output pulse train from the optical fiber 22. The combination stage 14 can be structured similarly to the division stage 12 but configured to process the output pulses so as to combine them. For example, the combination stage 14 can include at least two polarizing beam splitters 30A, 30B. The polarizing beam splitters 30A, 30B can be configured to combine at least two output pulses from the output pulse train to generate a combined output pulse.

FIG. 5 shows an embodiment of the system 100 with only one division stage 12. The first forward pulse 1 can be generated from the pump source 16. The first forward pulse 1 can be split into the second forward pulse 2 and the third forward pulse 3 by the division stage 12. The second forward pulse 2 and the third forward pulse 3 can be passed through the optical fiber 22. The output pulse train from the optical fiber 22 can be directed through the combination stage 14. For example, the output pulse 2' (the output pulse corresponding to the $2^{nd}$ forward pulse) can pass through the second arm path 26 of the stage 14. The third output pulse 3' (the output pulse corresponding to the $3^{rd}$ forward pulse) can pass through the first arm path 24. Upon meeting at the second polarizing beam splitter 30B, the second output pulse 2' and the third output pulse 3' may be caused to constructively interfere and collimate to generate a combined output pulse. The constructive interference can be achieved by adjusting the difference in path length between the first arm path 24 and the second arm path 26. Other first arm path 24 and/or second arm path 26 configurations can be used. This can include other angles and number of directional changes.

The ability to generate a larger number of pulses may be practically limited only by the available power of the pump source 16. Although the division technique can itself be theoretically lossless, the availability of a photonic crystal fiber 22 with a net anomalous dispersion of near 800 nm can allow a smaller fiber core to provide larger waveguide dispersion, which can translate to coupling efficiencies on the order of 30%.

While FIG. 5 shows an embodiment of the system 100 having a single division stage 12 and a single combination stage 14, it is contemplated for the system 100 to have any number of division stages 12 and/or combination stages 14. For instance, there may be two or more than two division stages 12 and two or more than two combination stages 14. For some embodiments, the number of combination stages 14 may be the same as the number of divisional stages 12. Combining the output pulses can include scanning for a delay time between output pulses within the combination stage 14.

Combining the output pulses may further include active feedback to ensure temporal overlapping between output pulses can be achieved. This can be done by monitoring pulse characteristics, such as autocorrelation traces, which may be done via an autocorrelator 35. In some embodiments, the output pulse from the combination stage 14 can be passed through the autocorrelator 35 before the output pulse is caused to exit the system 100. The detected delay time and autocorrelation trace data may be used to temporally combine the output pulses that may not be fully combined via the combination stage. In some embodiments, the output pulse combined via reverse propagation in stage 12 can be passed through the autocorrelator 35 or other optical characterization device before the output pulse is caused to exit the system 100. In some embodiments, active stabilization techniques may be used for more efficient pulse combination. For example, a 0.3% change in soliton peak power (e.g., due to variation in coupling efficiencies between the output pulses), could result in approximately a 0.5 nm change in center wavelengths, and thus an effective time delay of 45 fs between pulses as they propagate through the nonlinear optical medium 22. The peak powers of individual divided pulse can be actively controlled to compensate for any variation in coupling efficiency or any other system 100 instabilities that can result in timing jitter among the pulses. By using an information feedback loop to indicate whether there is temporal overlapping between pulses, active stabilization can be introduced into the system 100. For example, the information feedback loop can allow for adjustment of operational parameters (e.g., peak powers, polarizations, beam propagation direction, coupling efficiency of the optical fiber, etc.) to ensure temporal overlap between output pulses for combination.

Figure 9:
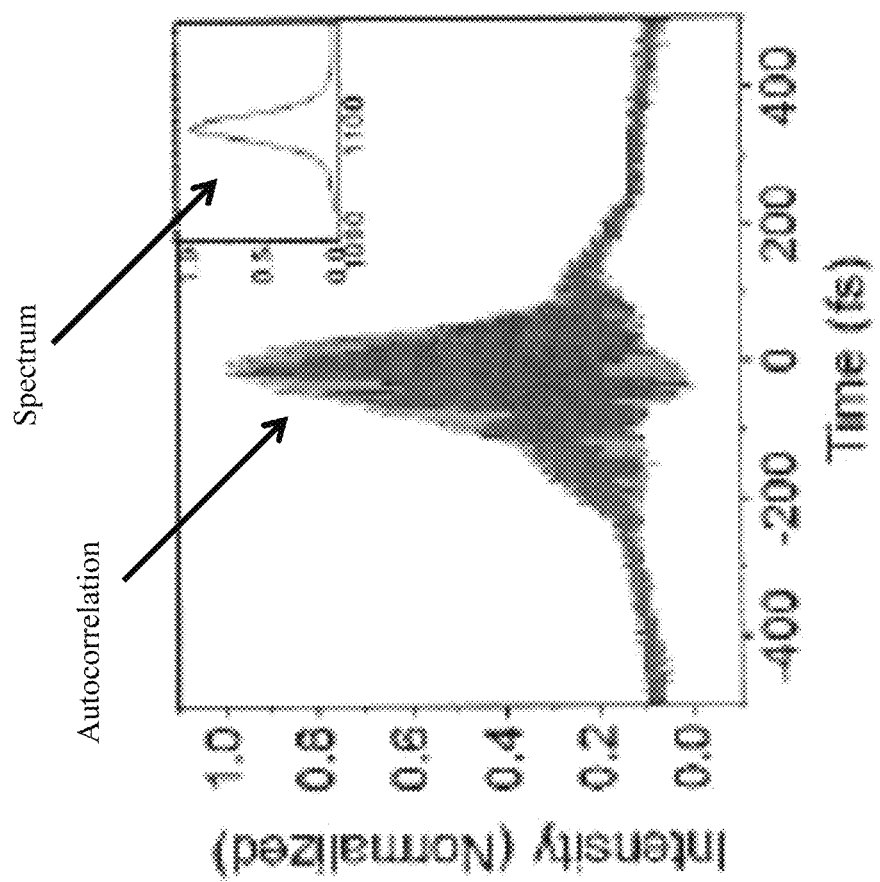
FIG. 9 is a plot of an autocorrelation trace and a spectrum of a combined output pulse that may be generated by an embodiment of the system.
Figure 10:
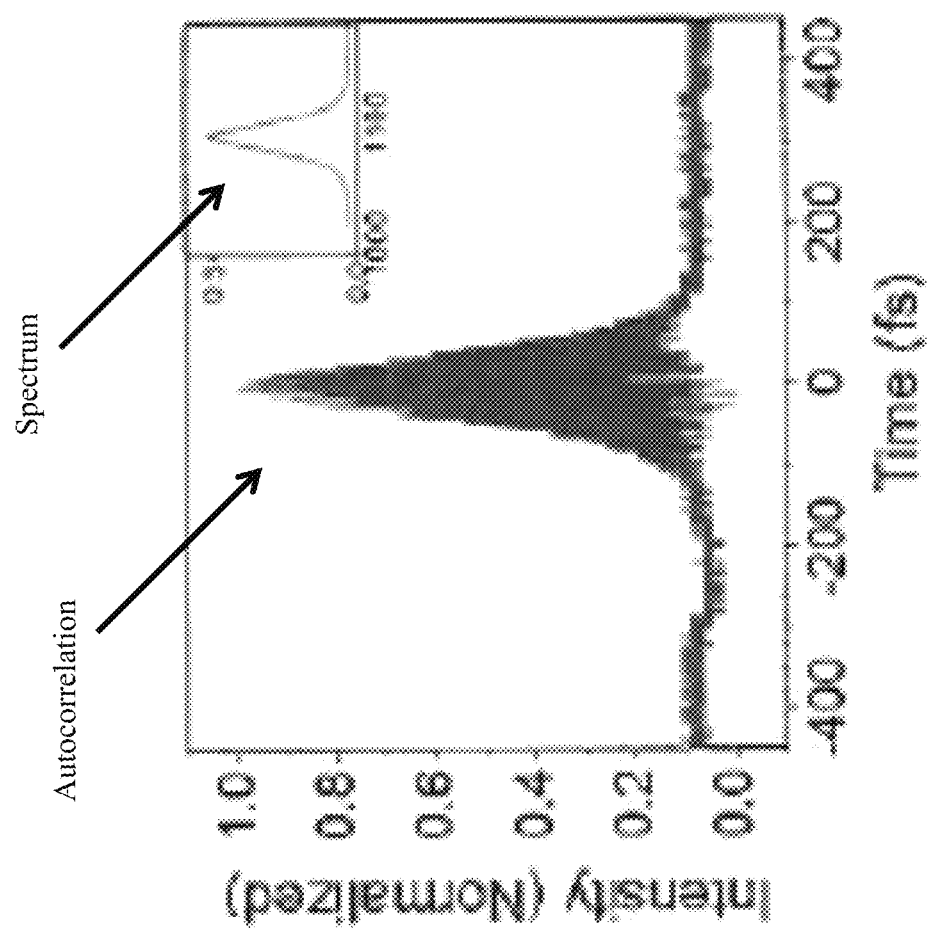
FIG. 10 is a plot of an autocorrelation trace and a spectrum of a single output pulse that may be generated by an embodiment of the system.
Figure 11:
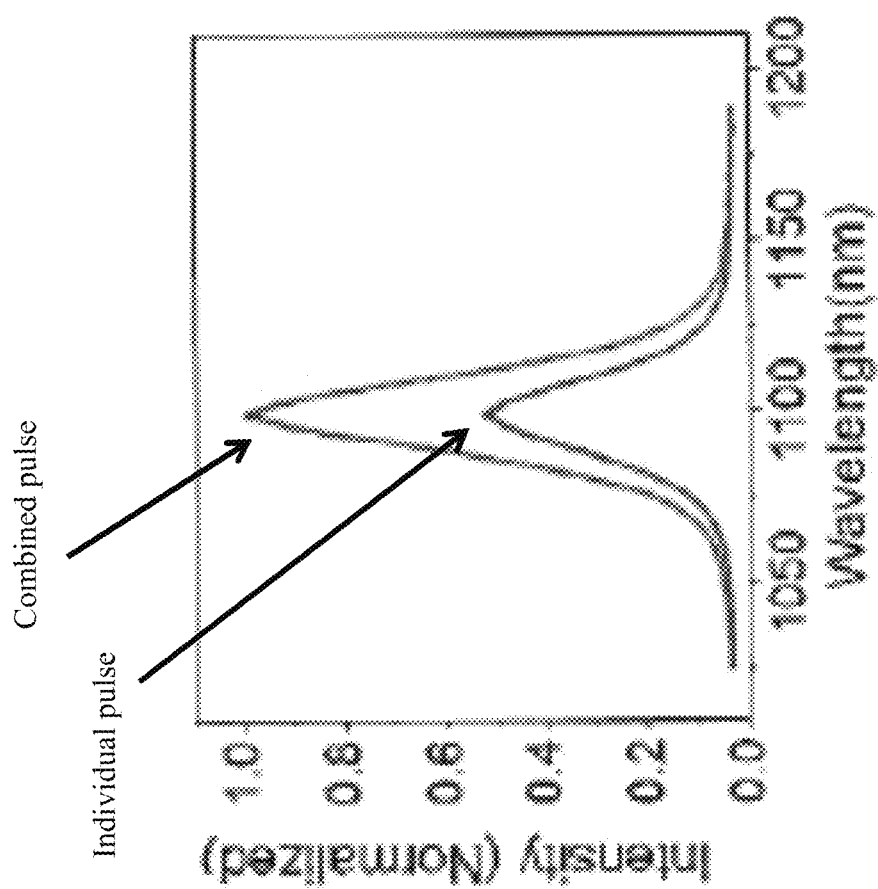
FIG. 11 is a plot of a spectrum of a combined output pulse and that of a single output pulse that may be generated by an embodiment of the system.

An autocorrelation of the recombined output pulses from an embodiment of the system 100 can be seen in FIG. 9, along with an uncombined pulse autocorrelation and spectrums shown in FIGS. 10 and 11. These figures show that a recombined output pulse from an embodiment of the system 100 may be slightly chirped. These figures further show that pulse width can be controlled in some embodiments of the system 100 to be approximately 87 fs, which can correlate well with single pulse autocorrelation and spectrum. These data demonstrate that combination of two output pulses can be achieved. These data also demonstrate the power scaling capability embodiments of the system 100 can have.

Referring back to FIG. 4, some embodiments of the system 100 can include at least one prism 36 (e.g., a SF11 prism). For example, the system 100 may be configured so that a prism 36 receives the parent pulse from the pump source 16 before the parent pulse enters any of the division stages 12. This may be done to pre-compensate for group velocity dispersion introduced by each division stage 12. In some embodiments, the system 100 can include a first prism 36A and a second prism 36B, or gratings.

Figure 6:
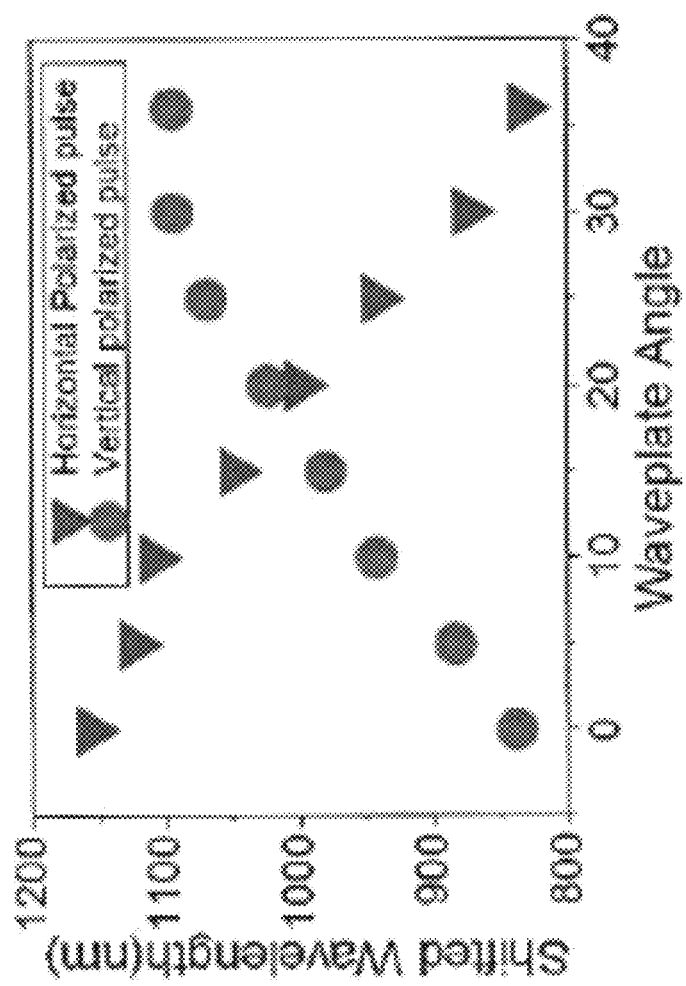
FIG. 6 is a Wave Plate Angle (to control pulse peak power) versus Shifted Wavelength plot for two divided pulses that may be generated by an embodiment of the system.
Figure 7:
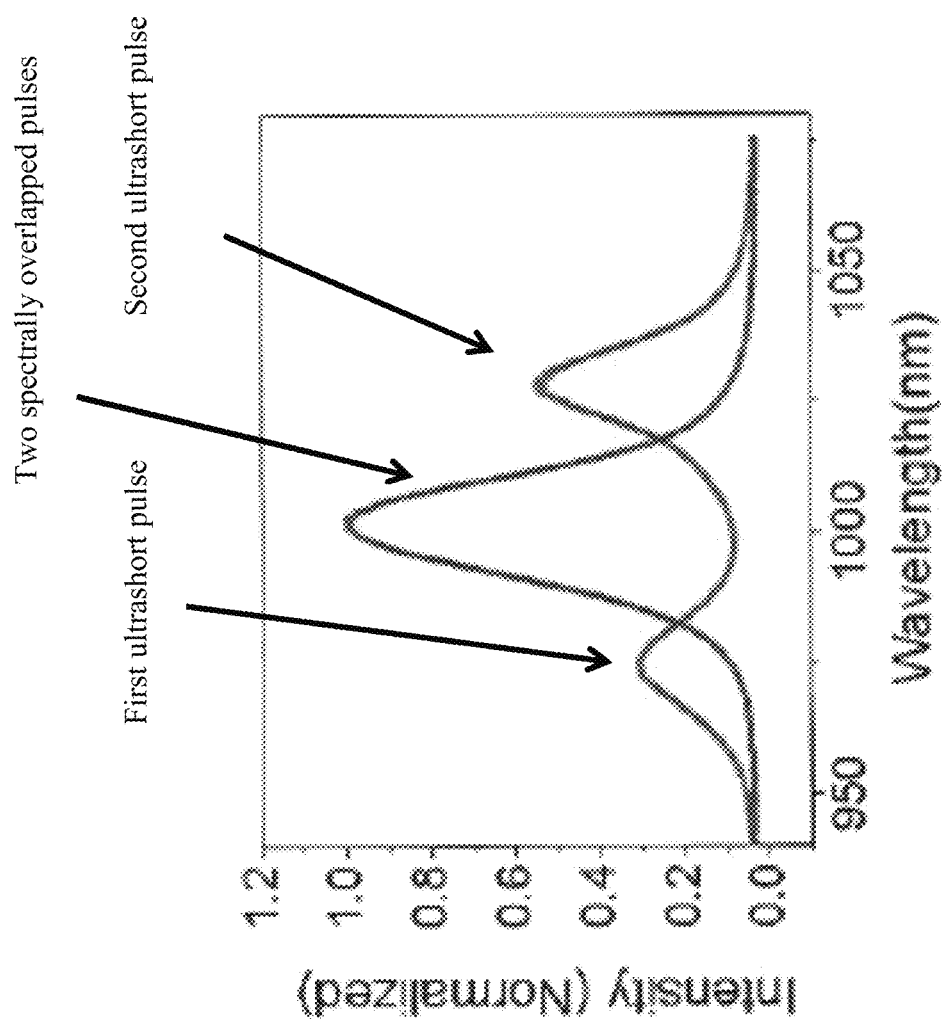
FIG. 7 is a Wavelength versus Intensity plot of two output pulses that may be tuned via an embodiment of the system.
Figure 8:
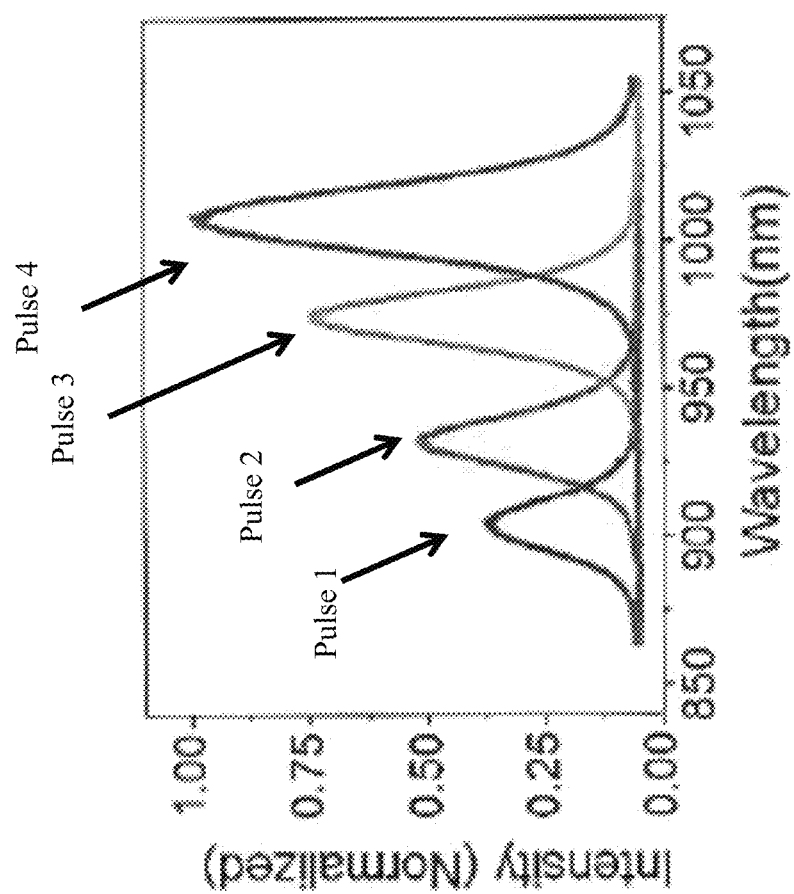
FIG. 8 is a Wavelength versus Intensity plot of four output pulses that may be tuned via an embodiment of the system.

Referring to FIGS. 6-8, embodiments of the system 100 can be used to generate at least one output pulse that is tunable. For example, an embodiment of the system 100 can be configured to tune an output pulse by varying the input energy of at least one divided pulse prior to the divided pulse's entrance into an optical fiber 22. This can be achieved, for example, by rotating the wave plate 28 that controls the ratio of pulse splitting (e.g., a preceding wave plate 28 of a division stage 12) or by using an attenuator. FIG. 6 shows a plot of center wavelengths of two divided pulses as a function of wave plate 28 rotation angle. As can be seen from FIG. 6, most of the power may be initially confined to a divided pulse with a horizontal polarization state, which may lead to significant wavelength shift. As the wave plate 28 is rotated, power can be transferred to a divided pulse with a vertical polarized state. Transferring power to and from horizontal-polarized divided pulses and vertical-polarized divided pulses may facilitate tuning the system 100. Embodiments of the system 100 can be further configured to provide a continuous tuning of wavelength(s) in opposite directions. This may facilitate tuning the system 100 within a range that extends above the center wavelength of a divided pulse. Within some embodiments, a tuning range of 300 nm can be achieved. Other tuning ranges (e.g. 100 nm, 400 nm, 600 nm, etc.) can be provided for different embodiments to meet a particular set of design criteria. In one embodiment, a divided pulse with central wavelength of approximately 845 nm can be tuned within a range spanning from 850 nm to 1150 nm. In at least one embodiment, independent tuning of each divided pulse can be performed. This can be achieved, for example, by using a variable neutral density filter within each polarization arm for some embodiments.

Results in FIGS. 6-8 were obtained by recording the relationship between single-pulse soliton energy and the frequency shift of the resultant output pulse from an embodiment of the system 100. An Andor spectrometer (SR-500i-A-R) with an InGaAs IR camera (iDus InGaAs 490A-1.7) was used to measure the output pulse spectrum. A wavelength shift from 850 to 1250 nm was achieved by varying the input pulse energy, with further tuning limited by the second zero-dispersion wavelength (~1270 nm) of a photonic crystal fiber 22 used in the system 100. The polarization of the output pulses was maintained from fiber birefringence. The average power of the first-order soliton at 1100 nm with a 28 nm bandwidth (corresponding to a 40 fs pulse) was measured at ~3 mW. As noted herein, the one-to-one mapping between the input pulse energy and the output wavelength presents a significant limitation on the achievable peak power and the average power at a particular wavelength for conventional soliton self-frequency shift source architectures. Using an embodiment of the system 100, two pulses were generated by blocking one arm 24, 26 of a division stage 12. A broadly tunable two-color output was achieved by varying the input pulse energy via rotation of the wave plate 28. This allowed for controlling the ratio of the pulse splitting in a second pair of polarizing beam splitting cubes 30. FIG. 6 shows the center wavelengths of the two pulse copies as a function of the wave plate rotation angle, illustrating continuous tuning of the wavelength in opposite directions over a range of 300 nm spanning from 850 to 1150 nm. Independent tuning of each pulse wavelength was also possible (e.g., with a variable density neutral density filter in each polarization arm).

FIG. 7 shows an exemplary spectrum of a two-color output generated from an embodiment of the system 100. A two-color output (e.g., an output comprising two output pulses, each at a different center wavelength) may be generated from a single division stage system 100 in connection with a nonlinear optical medium 22, for example. A first ultrashort pulse is shown centered at 975 nm and a second ultrashort pulse is shown centered at 1030 nm. The input pulse energy of the two divided pulses can also be tuned by adjusting the wave plate 28 so that the two corresponding output pulses that may be generated can have center wavelengths that are identical, or approximately identical, to each other. This demonstrates that the achievable average power at the output wavelength can be at least double the average power that can be achieved using an individual undivided pulse.

FIG. 8 shows an exemplary spectrum of a four-color output from an embodiment of the system 100. A four-color output (e.g., an output comprising four output pulses, each at a different wavelength) may be generated from a double division stage system 100 in connection with a nonlinear optical medium 22, for example. The four pulses in FIG. 8 were generated by adjusting the splitting ratios of a first division stage 12A and a second division stage 12B. The figure shows output pulses with shifted center wavelengths of 905 nm, 932 nm, 974 nm and 1004 nm.

Figure 13:
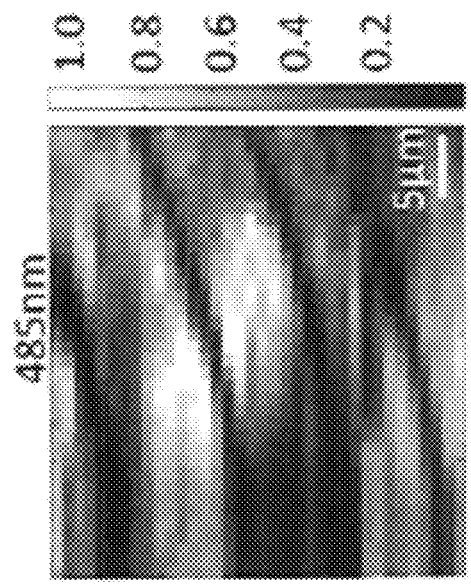
FIG. 13 is a dual-polarization second harmonic image of a tetragonal barium titanate (BaTiO3) crystal sample, showing an image that may be obtained in one scan by using a second polarization state of an output generated from an embodiment of the system as a pulse source for imaging.
Figure 12:
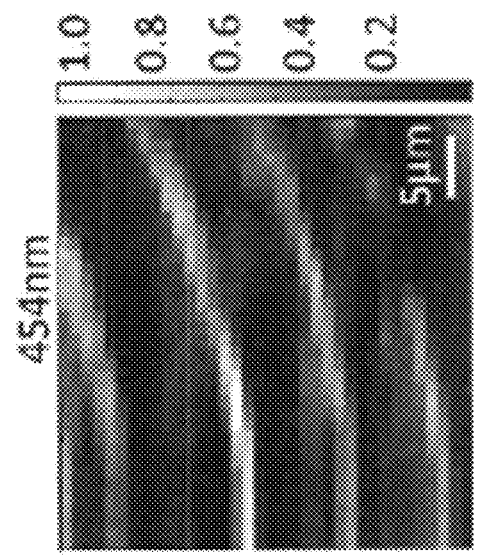
FIG. 12 is a dual-polarization second harmonic image of a tetragonal barium titanate (BaTiO3) crystal sample, showing an image that may be obtained in one scan by using a first polarization state of an output generated from an embodiment of the system as a pulse source for imaging.

Referring to FIGS. 12-13, embodiments of the system 100 may be further configured to generate an output for additional applications. For example, the output can be used in polarization multiplexing imaging. For instance, a two-color embodiment of the system 100 generating an output comprising two output pulses, one with a center wavelengths of 908 nm and one with a center wavelength of 970 nm. Each output pulse of the output can have a polarization state that is orthogonal to the other output pulse. The output can then be used as an excitation beam to facilitate imaging a crystal having alternating domains. For example, a sample can include a tetragonal barium titanate (BaTiO3) crystal sample having alternating domains. Second harmonic generation (SHG) imaging can be performed by raster scanning of the sample with the excitation beam. By examining the SHG signal at 454 nm and 485 nm, polarized SHG images at both polarization states can be obtained simultaneously in one scan. Exemplary scan images of each are shown in FIGS. 12-13. The results of FIGS. 12-13 demonstrate that a simultaneous dual-polarization SHG microscopy can be performed with an embodiment of the system 100 providing the excitation beam.

While an optical fiber 22 can be used as the nonlinear optical medium 22, other nonlinear optical mediums 22 can be used. Nonlinear optical medium 22 that can generate an output pulse having a center wavelength that differs from that of its corresponding divided pulse can be used. As described above, some embodiments can include soliton frequency shift, which may include soliton self-frequency shift via a nonlinear optical fiber 22. Other embodiments may include parametric gain generation mediums. Examples may include an optical parametric oscillator, a fiber based optical parametric oscillator, an optical parametric amplifier, etc.

With an optical parametric oscillator system, the parent pulse can be converted into two lower frequency waves (signal wave and idler wave) by means of a nonlinear optical medium 22. In one implementation, after the divided pulses of the parent pulse have been generated, each with alternating polarization states, the divided pulses may be directed into a photonic crystal fiber. The photonic crystal fiber may have a length determined by the characteristics of the parent pulse to generate parametric gain. This may be based on four wave mixing with the parent pulse operating in the normal dispersion regime of the photonic crystal fiber. After exiting from the photonic crystal fiber, an amount of either the signal or the idler pulse may be resynchronized with a subsequent parent pulse entering the photonic crystal fiber. This may be achieved via a feedback loop of the oscillator. An exemplary feedback loop may include a single mode fiber connected between a filter and a wavelength division multiplexer.

Dividing a high peak power parent pulse into N divided pulses, each with ideal peak power at one wavelength, can lead to an effective parametric generation of output pulses at different wavelengths. These parametrically generated output pulses can thereafter be combined to match the original undivided parent pulse temporal characteristics, and in doing so can have N times the peak power of the individual divided pulse. Average power may be limited by peak power of the parent pulse with conventional optical systems, but the inventive system 100 may provide an approximate N-times increase in parametrically generated average power.

After generation of the signal and idler divided pulses, the signal, idler and residual pump divided pulses may be individually combined to produce high peak power and high average power output pulses. This may not be achievable with conventional optical systems. The average power and peak power with the inventive system 100, however, may be increased theoretically by a factor N (e.g., the number of divided pulses the parent pulse is divided into). For example, generating 16 divided pulses can provide a 16 fold increase in average power and peak power when compared to current fiber optical parametric oscillator technologies. Pulse division may also reduce the nonlinearity each generated output pulse experiences, which may allow for (once combined) an output pulse of quality that may surpass one of equivalent peak power that would have propagated through an equivalent length of nonlinear medium (if this had been possible).

Parametric gain may depend on the relative polarization states of the parent and generated signal and idler pulses. The phase matching condition, which sets the wavelength window of the parametric gain, can vary with fiber birefringence. Some system 100 configurations can provide divided pulse polarization states and fiber orientation that may result in an effective polarization insensitive parametric gain. This may be beneficial if residual randomly fluctuating fiber birefringence becomes an issue on the fiber length scale.

Embodiments of the system 100 can be applied to both fiber and solid state optical parametric oscillators as well as fiber and solid state amplifying systems. For example, a high peak power parent pulse can be split into divided pulses, where the system 100 may be configured to use each of the divided pulses to individually generate parametric gain right near the pump peak power limit of the parent pulse. This may facilitate producing one signal pulse and idler pulse (at different wave-lengths from each parent pulse) for each divided pulse either with an optical parametric amplifier, or with an optical parametric oscillator, or with a variant of these two systems.

An optical parametric amplifier can be generated with a same configuration as the optical parametric oscillator. With an optical parametric amplifier system, the parent pulse can be converted into two lower frequency waves (signal wave and idler wave) by means of a second order nonlinear optical medium, yet there may be no cavity to cause oscillation of the signal or idler waves. With an optical parametric amplifier configuration, the pulse train of divided pulses from the division stage 12 can be directed through a parametric gain medium, then combination of the signal, idler, or parent pulses can be performed after exiting the optical parametric amplifier.

Optical parametric oscillators (OPO) can provide a means for generating widely tunable ultrafast optical sources for a variety of important and quickly evolving research, industrial, and medical applications. Specifically, OPOs may be used in applications such as CARS (Coherent Anti-Stokes Raman Scattering) microscopy, multi-photon imaging, and other nonlinear microscopy techniques. Conventional OPOs however, can be bulky and expensive tools. By virtue of generating optical signals based upon nonlinear processes within a nonlinear optical medium, OPOs can generate very broadly tunable optical signals within important spectroscopic windows that other optical sources (such as lasers) cannot provide.

Fiber based OPO or Optical Parametric Amplifier (OPA) systems may provide compact, robust, and/or nearly alignment free sources for widely tunable parametrically generated optical pulses. The peak power of the pump pulse can be critical as may limit the overall output power and energy of parametrically generated pulses. Solid state OPO and OPA systems can be developed that provide high power sources for widely tunable parametrically generated optical pulses. Conventional solid state OPO and OPA systems typically have large footprints that may be undesirable.

Divided pulse amplification may be applied for reducing the peak power and then amplifying and recombining the copies of the same pulse within a doped gain media amplifier. Divided pulse lasers may also been applied for reducing the peak power of and then amplifying and recombining the copies of the same pulse within a doped gain media oscillator.

The techniques described herein for divided pulse amplification and the divided pulse laser have not previously been applied to parametric generation. Embodiments of the inventive system 100 can provide a means that can generate high average and peak power pulses within the robust and compact nature of the fiber based OPO and OPA. Embodiments of the inventive system 100 may be applied to both solid state and fiber OPO or OPA systems.

Although the generation of an optical signal based upon nonlinear interactions within a transparent medium can be attractive for widely tunable sources, the efficiency of converting energy from the pump signal to the widely tunable parametric signal may depend upon a nonlinear process which may be inherently limited by the peak power of the pump. For example, if the peak power of the pump is not large enough, the parametric gain within the oscillator may not be large enough to sustain oscillation against cavity loss. On the other hand, if the peak power of the pump is too large, the generated parametric signal may become large enough that it begins to back-convert energy into the pump signal which was supporting it, thereby decreasing it and ultimately setting a limit to its overall efficiency. Typical conversion efficiencies (below this critical peak power) are on the order of 5 to 10%. Pumping above this level may not lead to an increase in system efficiency but on the contrary may generate system noise and instability.

Although there are several ways of designing an ultrafast OPO which can increase the output power of the generated parametric signal, these techniques may ultimately limit the OPO design to solid state OPO systems often characterized by a large foot print, and may introduce critical alignment tolerances as a result. Finding a way to reduce the large size (sometimes an entire optical table), expensive cost, and/or maintenance requirements of these systems, while still keeping their ability to generate high average and peak power parametric signals over broadly tunable regions of the spectrum, may provide an attractive tool for applications requiring affordable, portable, and/or robust optical ultrafast imaging sources.

With these criteria in mind, using the second order ($\chi^{(2)}$) nonlinearity for parametric gain seen in most solid state nonlinear crystal based OPOs may not be as attractive as utilizing the third order ($\chi^{(3)}$) nonlinearity inherent in optical fiber as the nonlinear medium for the OPO. Fiber based OPOs can offer the potential for robust, low upkeep, inexpensive, and/or very compact systems.

However, the fiber may have a set nonlinearity and mode area, so spatial engineering, i.e.—increasing the spot size within the fiber to decrease the overall pulse intensity thereby increasing the maximum output power and conversion efficiency—may not be a clear option to increasing the peak power and average output powers of signals generated within.

Compact, completely fiber based high peak power pump sources may be available, as well as the ability to generate parametric signals by four wave mixing within optical fiber from these pump sources. Conventional system have not demonstrated efficiently utilizing these pump sources to their maximum potential for parametric conversion. This challenge to navigate the issue of critical pump peak power in the conventional fiber based OPO may be at least a factor that has stunted the development of the compact, robust, and/or all fiber based OPO system—limiting the output power (and peak power) to only a fraction of what they could otherwise be with present advances in fiber pump sources.

Differences between DOPA and DOPO:

The Divided pulse Optical Parametric Amplifier (DOPA) and the Divided pulse Optical Parametric Oscillator (DOPO) may also make use of pulse division in order to accomplish a specific aim, but the specific aim and application with which each is tailored to can be distinct.

For the DOPA, the specific aim may be to efficiently amplify ultrafast pulses at one wavelength to higher average and peak powers at the same wavelength (before excessive nonlinear phase accumulation results in pulse degradation or pulse break up). Such a system may achieve this aim by dividing an initial pulse at one wavelength into copies, thereby keeping the peak power of each individual copy below a critical level so that during amplification each pulse copy is not deformed. Later, after the parametric amplifier, each copy may be recombined in order to generate a large peak power pulse of good quality.

Embodiments of the inventive system 100, can use pulse division as well to create higher average and peak power oscillators but the application may differ substantially. Primarily, DOPA is an amplifier (amplification of single wavelength divided pulses at the same wavelength) and the other is a parametric oscillator (creation of two new wavelength pulses [both created by a pump pulse copy]). The divided pump pulses may not be amplified with inventive system 100 in this case. In fact, in some embodiments the divided pump pulses may decrease in energy as they are individually used to generate parametric gain and create pulses at different wavelengths. Another way which the two systems may differ is that DOPA is a parametric amplifier and the DOPO is a parametric oscillator. The dynamics within an amplifier and an oscillator are different and the reasons for pulse division are also different. As already mentioned, in DOPA, pulse division may be employed to limit the peak power of the pulse for amplification. In the DOPO, pulse division may be employed to match the optimal peak power for parametric generation (creation of two new wavelength pulses).

For the DOPO, the specific aim may be to directly generate high average and peak power pulses from an oscillator cavity without the added complexity, cost, and/or space of needing to externally amplify pulses. In general, large peak power pulses may accumulate large nonlinear phase shifts, and these nonlinear phase shifts, although tolerated slightly differently depending on the type of pulse propagating within the oscillator cavity, ultimately can limit the output power of ultrafast lasers. In order to circumnavigate the problem of pulse break up, the DOPO may split the circulating pulse into low peak power copies before it experiences amplification within the gain medium of the oscillator. The pulse can be later recombined to a higher peak power pulse before being coupled out of the cavity.

Unlike DOPA, DOPO is an oscillator with a feedback loop. However, the DOPO may be configured for dividing the pump pulse into copies before it enters into the oscillator. The divided pulses in the DOPO may be used in order to efficiently create parametric gain thereby generating signal and idler pulses at different wavelengths.

It is contemplated that embodiments of the system 100 can remove this barrier to signal generation in fiber based OPO systems, thus simultaneously providing a compact, widely tunable, as well as high output power and/or high peak power source which may find immediate application in multi-photon imaging as well as several different coherent Raman microscopy techniques which rely upon high peak power sources within spectroscopic windows which frequently parametric gain is best suited to access.

In some implementations, embodiments of the system 100 may be configured for generating a parametric output. The system 100 may utilize a dividing or combining stage to split or combine pulses into or from copies for managing a total parametrically generated output power, peak power, or repetition rate at either the signal, idler or pump wavelengths, such as a solid state OPO or OPA or fiber based OPO or OPA. In some embodiments, the system 100 may operate in an OPA configuration and employ the division of the pump pulse before the parametric gain medium and recombination of the signal, idler, or pump pulses in any configuration, after exiting the OPA. Further, the system 100 may be embodied in an OPO instead of an OPA, or in a system in which the division and recombination occur within the oscillator itself. Some embodiments can provide for an all fiber based OPO or OPA that is compact, robust and/or alignment free. Further embodiments may be configured to increase the overall usable average output power of OPO or OPA systems by order of the pulse division after recombination. Further embodiments may be capable of increasing the overall output peak power of OPO or OPA systems by order of the pulse division once recombined, and may increase the effective repetition rate OPO or OPA system outputs, with division of the pump pulse before input to the system and with no recombination at the output of the system.

Referring to FIGS. 14-18, several aspects of an exemplary DOPO system 100 are disclosed. In one aspect, the DOPO system 100 may be configured for division and recombination of the pump pulse outside of the parametric gain medium, wherein division and recombination of the pulse signal may occur before or after the parametric gain medium. Aspects may include division of the pump pulse being performed at the dividing stage 12 and before the pump pulse enters the second stage 15 (e.g., a fiber OPO or fiber OPA). The dividing stage 12 can include polarizing beam splitting cubes 30 and a combination of wave plates 28. Alternatively, the dividing stage 12 can include birefringent crystals and a combination of wave plates 28. The pump pulse leaving the second stage 15 can enter a recombination stage 14 for recombination of the pump pulse, the signal pulse, and the idler pulse. Alternatively, recombination of the pump pulse, signal pulse, and idler pulse can be performed with a separate recombination stage 14 for each of the idler pulse and the signal pulse, wherein a dividing stage 12 a polarization rotation for recombination configuration can be used for the pump pulse. Some embodiments can include recombination of either the idler pulse and/or the signal pulse alone, but not that of the pump pulse which can involve: (a) use of a dividing stage 14 and polarization rotation for recombination, or (b) use of a dividing stage 14 and a polarization rotation for recombination of the pump pulse, wherein a separate combining systems is used for the idler pulse and the signal pulse.

In another aspect, division and recombination may be implemented within an oscillator possessing a parametric gain medium. For example, the pump pulse can be divided before entering the parametric gain medium but within the oscillator and recombination of the pump and signal and idler pulses after exiting the parametric gain medium but also within the oscillator with any one or many combinations of the embodiment subsections identified herein.

Dividing of high peak power pulse into N copies each with ideal peak power at one wavelength can lead to an effective parametric generation of pulses at multiple wavelengths. These parametrically generated pulses can thereafter be combined to match the original undivided pump pulse temporal characteristics and in doing so may have N times the peak power of the individual copy and, because generation can be limited by peak power, can provide an approximate N time increase in parametrically generated average power. Embodiments of the system 100 can be applied to both fiber and solid state optical parametric oscillators as well as amplifying systems. A method for implementing the system 100 can include dividing a high peak power pump pulse into copies of itself and use each of the pulse copies to individually generate parametric gain right near the aforementioned pump peak power limit—thereby producing one signal and idler pulse (at different wave-lengths from each pump pulse) for each pump pulse copy either with an optical parametric amplifier (OPA), or with an optical parametric oscillator (OPO), or with a variant of these two systems.

After generation of the signal and idler pulse copies, the signal, idler and residual pump pulse copies can be individually combined to produce high peak power high average power pulses which may not normally be possible within such a system. The average power and peak power with such a system can be increased by a factor N—the number of copies the original pump pulse is divided into. As a reference, it is not uncommon to divide pulses into 16 copies of each other. Thus, embodiments of the system 100 may offer the potential for a 16 fold or larger increase in average power and peak power when compared with current fiber OPO technologies. The pulse division may also reduce the nonlinearity each generated pulse sees allowing for—once combined—a pulse of quality which would surpass one of equivalent peak power which would have propagated through an equivalent length of nonlinear medium (if this had been possible).

Embodiments of the system 100 can be configured for parametric generation based upon four wave mixing in the fiber, but can also be applicable to solid state crystals or any other type of nonlinear optical processes which are intensity or peak power limited, such as Raman soliton self frequency shift.

The pulse division and recombination can be accomplished in any of the manners described herein. As the generated signal and idler pulses are at a different wavelength than the pump pulse, embodiment of the system 100 can utilize different combining stages 14 for each wavelength (e.g., if using birefringent crystals) or utilize the same dividing stages 12 and combining stages 14 if using polarizing beam splitters 30 and half wave plates 28.

As parametric gain may depend on the relative polarization states of the pump and generated signal and idler pulses—and the phase matching condition—which sets the wavelength window of the parametric gain—may vary with fiber birefringence, embodiments of the system 100 are contemplated for adopting a certain configuration of divided pump polarization states and fiber orientation which can result in an effective polarization insensitive parametric gain if residual randomly fluctuating fiber birefringence becomes an issue on the fiber length scale the current invention is best suited towards.

Figure 14:
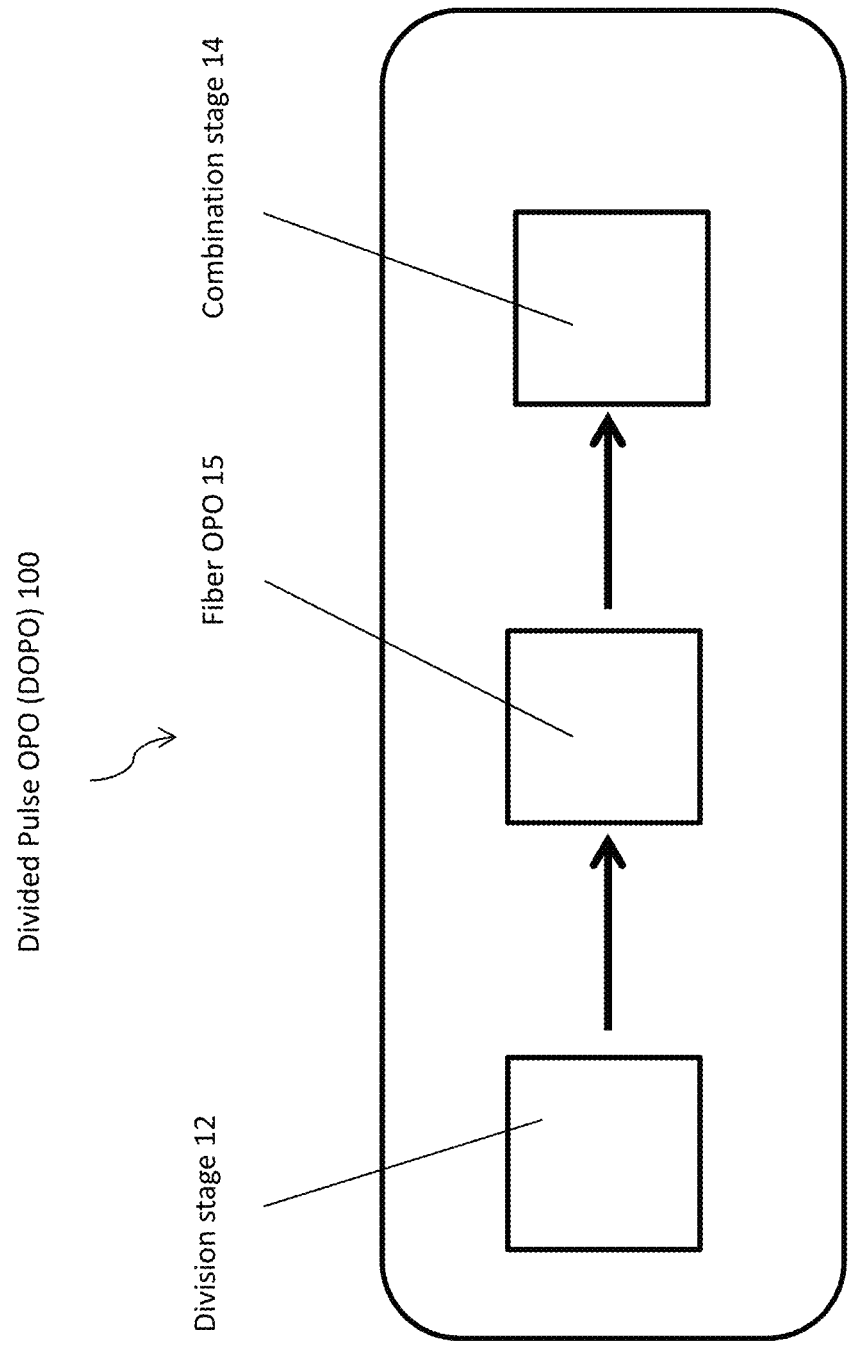
FIG. 14 shows an exemplary block diagram representing an embodiment of a divided pulse optical parametric oscillator (DOPO) that may be generated by the system.

Referring now to FIG. 14, in one exemplary embodiment a divided pulse optical parametric oscillator (DOPO) 100 can include three stages. The first stage 12 may be a pump pulse division stage in which pulses may be divided at wavelength $\lambda_p$. The second stage 15 may be configured as a fiber OPO (also referred to herein as FOPO). The third stage 14 may be a pulse signal combination stage in which pulses can be combined at various wavelengths $\lambda_p$, $\lambda_s$ and $\lambda_i$, wherein $\lambda_p$ is the pump wavelength, $\lambda_s$ is the signal wavelength and $\lambda_i$ is the idler wavelength.

Figure 15:
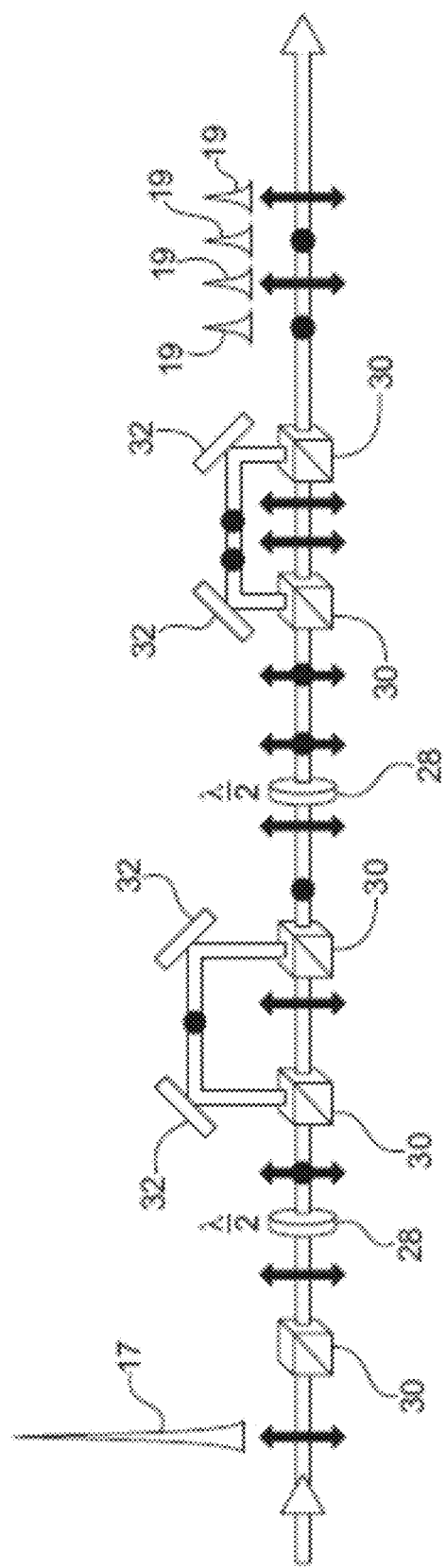
FIG. 15 shows an exemplary embodiment of a laser pump pulse division stage that may be part of an embodiment of the DOPO.

Referring next to FIG. 15, an exemplary embodiment of first stage 12 is shown schematically. A high peak power ultrafast pulse at one wavelength $\lambda_p$, can be divided into copies of itself with alternating polarizations. The high peak power ultrafast pulse 17 which is used to pump the DOPO can be divided into four copies 19 of itself using combinations of polarizing beam splitting cubes (PBS) 30 and half wave plates (HWP) 28. In other embodiments high peak power ultrafast pulse 17 may be divided into more or less than four copies 19. P-polarized light is indicated by an up and down arrow and S-polarized light by a circle. The choice of polarizing beam splitting cubes 30 can be made so that at the final stage of combination (see, e.g., FIG. 17), the same system (FIG. 15) used to split the high peak power ultrafast pulse 17 into copies 19 of the high peak power ultrafast pulse 17, can be used to recombine the residual pump pulse copies, as well as the newly generated signal and idler pulses, which are at different wavelengths than the high peak power ultrafast pulse 17. More description of this will be provided below in the description of the third stage 14. However, it is noted that this stage 12 as an alternative embodiment of the DOPO may employ birefringent crystals of varying thicknesses with crystal axes oriented at 45 degrees to each other in order to split the high peak power ultrafast pulse 17 into copies of itself. However, if such a system 100 were also to be used for pulse recombination, the wavelength dependent birefringence of the crystals may result in imperfect recombination at the signal and idler wavelengths $\lambda_s$, $\lambda_i$ if the dividing system is optimized for the pump wavelength $\lambda_p$.

In the division stage 12, the relative temporal delay imposed upon the pulse each time it is split into orthogonal polarization states may arise from the difference in free space propagation between the two polarization states. This may be advantageous for the DOPO for two reasons. First, the temporal delays can be made much larger than can be achieved using birefringent crystals. This increased delay can provide an additional capability to the FOPO, wherein highly birefringent photonic crystal fiber can be used to create a polarization independent parametric gain. The reasons for why longer temporal delays between pulses can be attractive for this capability is discussed in more detail below with respect to the second stage (see FIG. 16). The second reason having a temporal delay resulting from free space propagation can be useful, but not essential, for the disclosed system 100, is the index of refraction for free space propagation may be essentially wavelength independent which can carry the added benefit of allowing the dividing system to also be used as the combining system for the newly generated wavelengths. In a preferred embodiment, achromatic broadband anti-reflective (AR) coated wave plates 28 and broadband PBS 30 coatings that are capable of spanning the entire range of signal, pump, and idler wavelengths, may be desirable in order to maintain system efficiency. It may also be desirable to match the relative losses which each pulse copy sees as it travels through the entire division system 12. The FOPO may be sensitive to pump peak power so variances in the relative losses which each pulse sees can lead to an uneven distribution of peak powers which may influence the FOPO efficiency levels.

Figure 16:
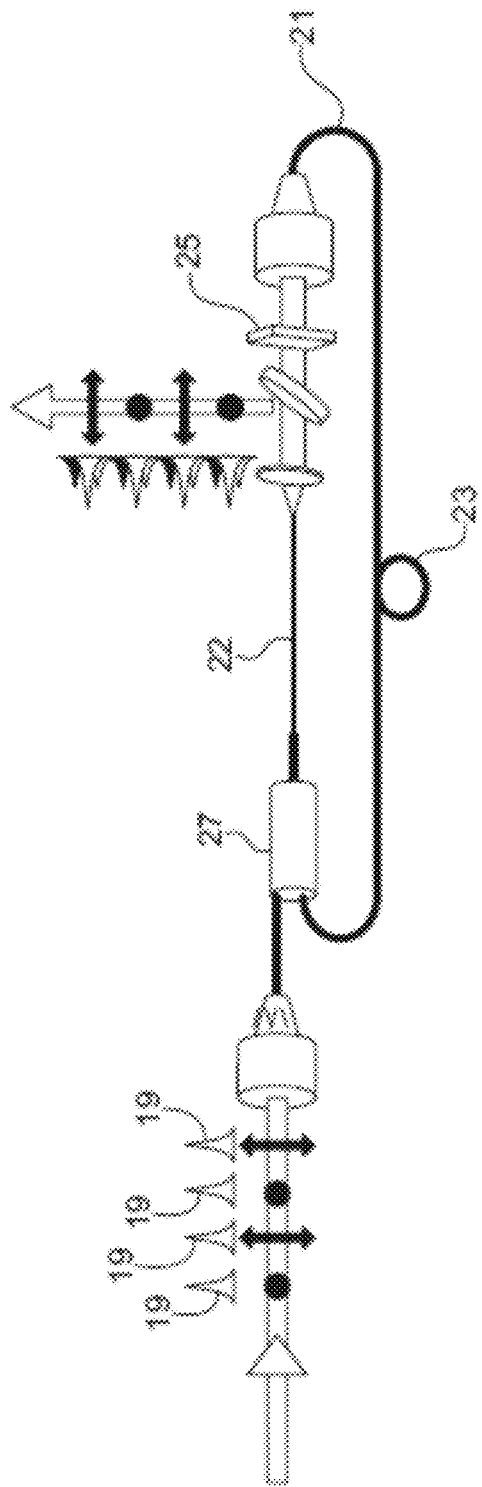
FIG. 16 shows an exemplary embodiment of a fiber OPO stage (FOPO) that may be part of an embodiment of the DOPO.

Referring next to FIG. 16, a Fiber OPO (FOPO) or second stage 15 is shown. After the pump pulses 17 have been divided into copies 19 with alternating polarization states, the pulses 19 can be coupled into the photonic crystal fiber (PCF) 22, with the length of PCF 22 determined by the characteristics of the pump pulse, to generate parametric gain based on four wave mixing. After exiting from the PCF 22, an amount of either the signal or the idler pulse can be resynchronized with the next pump pulse entering PCF 22, via a feedback loop 21 of the oscillator. An exemplary feedback loop 21 may include a single mode fiber (SMF) 23 connected between a filter 25 and a wavelength division multiplexer 27.

As efficient recombination of the DOPO can depend on the polarization states of each pulse 19 being maintained through the fiber OPO, there may be a variety of different techniques which can be used to create a polarization or effective polarization insensitive gain. Some of these techniques may require splitting pulses 19 into alternating polarization states which the disclosed system 100 can be configured to provide. In cases where polarization maintaining PCF 22 is used and each pulse copy 19 is split by the PCF 22 into additional pairs, the large free space delay, which PBS cubes 20 offer, can allow many pump copies to be created and allows each pump copy 19 to split into a further pair, with corresponding temporal delay, within a birefringent PCF and not interfere with the original neighboring pump copies 19.

Figure 17:
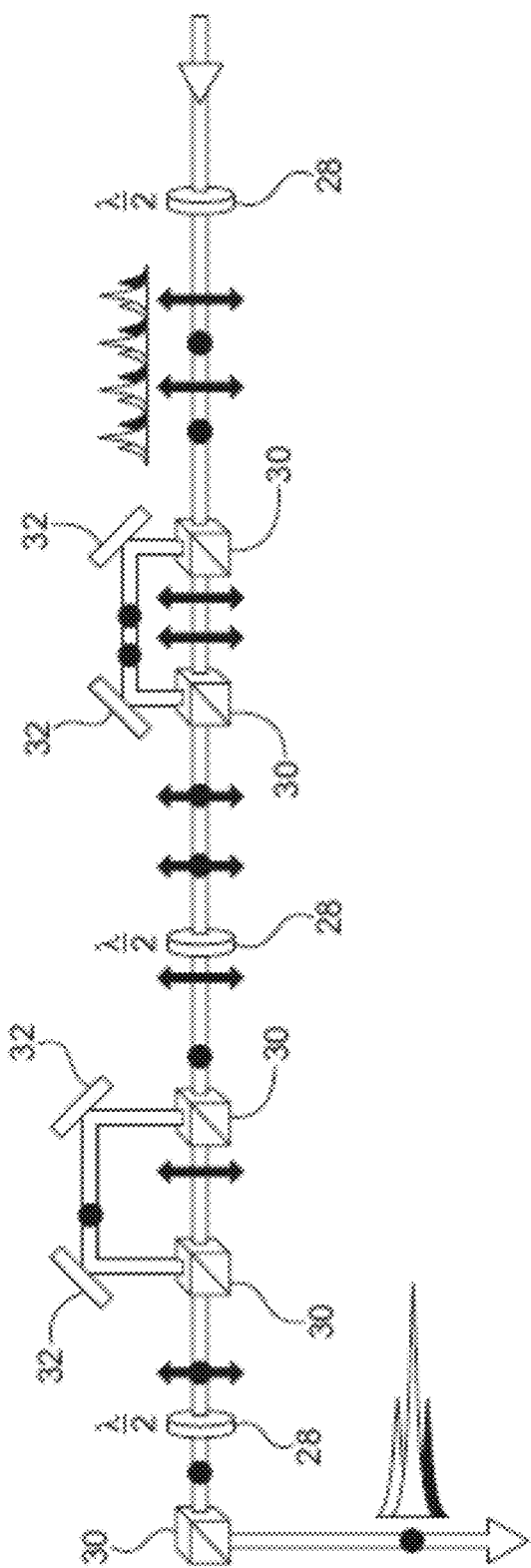
FIG. 17 shows an exemplary embodiment of a combination stage that may be part of an embodiment of the DOPO.

Referring next to FIG. 17, a recombination stage 14 or third stage is shown. The recombination of the generated signal and idler pulses, as well as the remainder of the pump pulse, may be accomplished in several ways. In one embodiment the recombination stage 14 can be achieved using the division stage 12 as a recombiner and rotating the polarization state of each pulse to its orthogonal polarization state with a half wave plate 28 or a polarization-rotation periscope. The generated signal and idler pulses, as well as the remainder of the pump pulse can be applied at the output end of the division configuration to produce the combined signal and idler pulses, and remainder of the pump pulse.

In an alternative embodiment for DOPO with respect to the recombination stage 14 three combining systems may be used, one for the signal pulse, one for the idler pulse, and one for the pump pulse. Although the use of three combiner systems may require a rigorous matching of temporal delays for accurate recombination, such a configuration can allow for the use of birefringent crystals, which can offer the advantage of compactness and ease of implementation.

Figure 18:
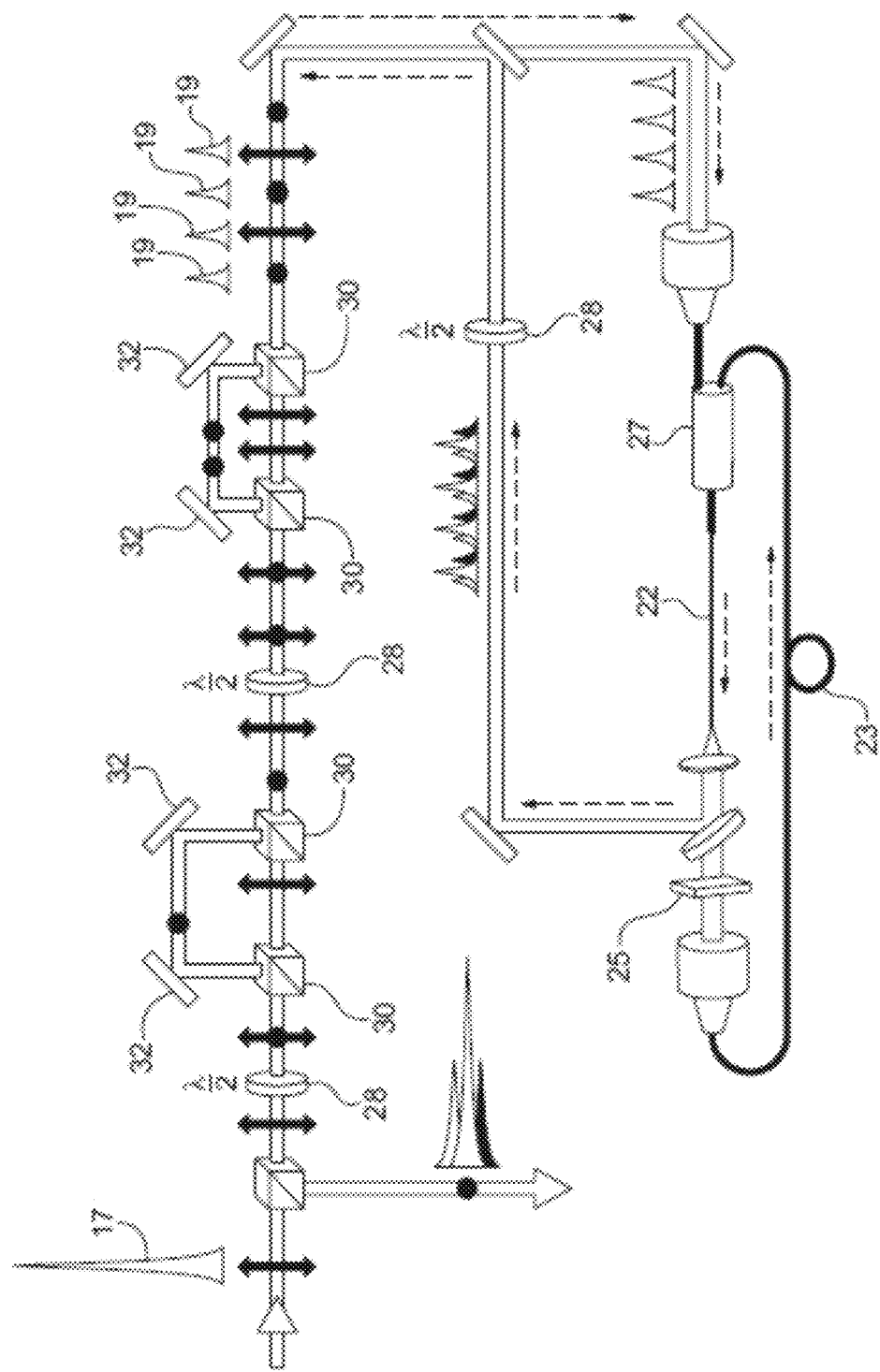
FIG. 18 shows a full schematic of an exemplary embodiment of the DOPO system including the first, second and third stages of FIGS. 15-17.

A full schematic of an exemplary embodiment of the DOPO system 100 first, second and third stages 12, 15, and 14 is shown in FIG. 18. Embodiments of the system 100 can be configured for generating a parametric output that utilizes a dividing and/or combining stage 12, 14 to split or combine pulses into or from copies for virtue of managing the total parametrically generated output powers, peak powers, or repetition rates at either the signal or idler or pump wavelengths, such as a solid state OPO or OPA or fiber based OPO or OPA. Embodiments of the system 100 for generating the parametric output may further be configured to operate in an OPA configuration and employ the division of the pump pulse before the parametric gain medium and recombination of the signal, idler, or pump pulses in any configuration described above, after exiting the OPA. Embodiments of the system 100 can be embodied in an OPA, OPO or the system in which the division and recombination occur within the oscillator itself.

As noted herein, embodiments of the system 100 can be configured for generating a nonlinear output utilizing a dividing or combining stage 12, 14 to split or combine pulses into or from copies for managing the total nonlinearly generated output power, peak power, or repetition rate at the various output wavelengths, such as in a solid state OPO or OPA or fiber based OPO or OPA, or Raman soliton self-frequency shift source. The system 100 can generate the nonlinear outputs and may operate in an OPA or Raman soliton self-frequency shift configuration and employ the division of the pump pulse before the parametric gain medium and recombination of the signal, idler, nonlinear outputs, Raman soliton self-frequency shifted pulses, or pump pulses in any configuration, after exiting the parametric gain medium. The system 100 may be further configured as an OPO instead of an OPA, or the system in which the division and recombination occur within the oscillator itself. The various methods and systems described herein can provide a means for increasing the overall peak power or average power of ultrafast sources generating nonlinear outputs within the architecture of an oscillator or amplifier.

Some embodiments of the system 100 can be used to facilitate label-free imaging without fluorescent staining, which may be useful for biological and biomedical applications. For example, label-free imaging without fluorescent staining can allow the potential for observing complex and dynamical processes in a specimen in a natural state, and for extended periods of time.

Existing coherent Raman imaging systems usually fall into one of the two categories: single line vs. broadband. In the single-line category, excitation sources are tuned and then fixed to excite a single Raman peak. Single-line coherent Raman techniques can achieve video-rate imaging speed with dwelling times as short as 100 ns per pixel; however, they have limited specificity and meet significant challenges when applied to resolving the complex spectral features often found in the fingerprint region (500-1500 $cm^{-1}$) and the congested C—H bands near 3000 $cm^{-1}$. For this reason, single-line coherent Raman imaging techniques are generally applied to applications where they can distinguish vibrational responses with enough specificity, such as in studying lipids and lipid metabolism.

On the other hand, broadband coherent Raman imaging techniques (e.g. broadband coherent anti-stokes Raman scattering (CARS), and hyperspectral stimulated Raman scattering (SRS)) provide much higher specificity as they capture vibrational spectra; yet, broadband modalities in general have slower speeds compared to single-line modalities due to the use of a spectrometer with dwell times commonly on the order of a few ms per pixel (longer integration times may be needed to compensate for the relatively low power density of excitation lines required to avoid sample damage over a broad spectrum), or techniques involving frequency scanning.

Embodiments of the system 100 can be used to provide a multi-line coherent Raman imaging method that enables both the high speed imaging afforded by single line coherent Raman imaging and the high specificity afforded by coherent broadband Raman imaging. This can allow for the simultaneous excitation of multiple vibrational peaks (e.g., within the band from ~500 to 3500 $cm^{-1}$).

Figure 19:
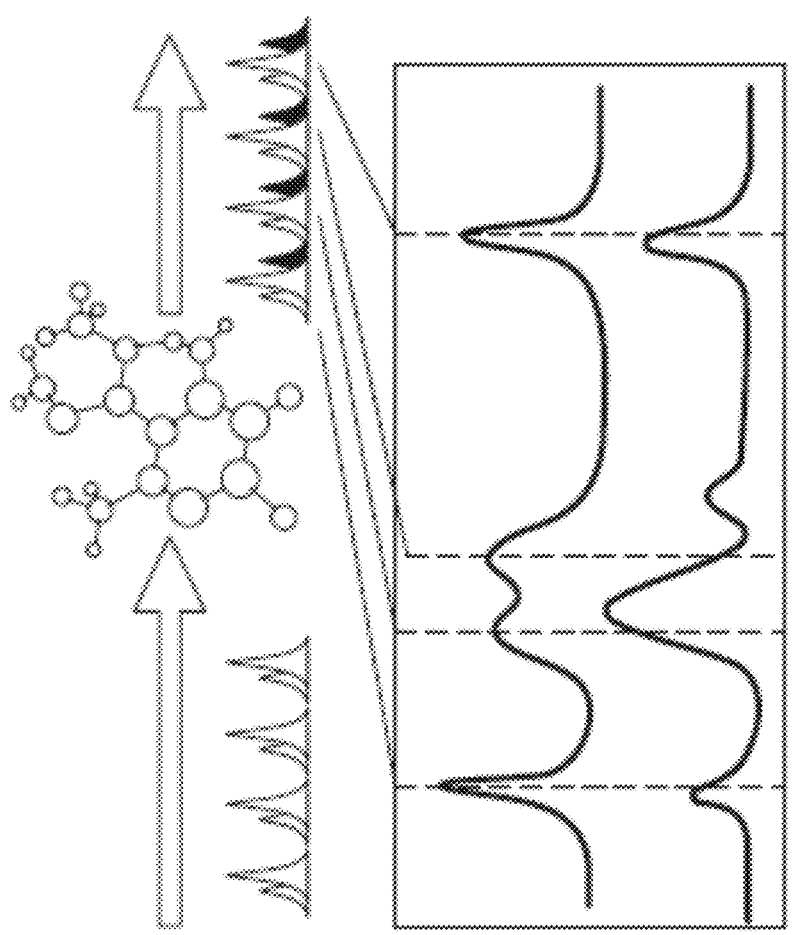
FIG. 19 is an exemplary schematic of high-specificity multi-line coherent Raman imaging using a multi-color excitation source.

FIG. 19 shows a schematic of high-specificity multi-line coherent Raman imaging using a multi-color excitation source from an embodiment of the system 100. Note that the spectral information captured from broadband coherent Raman imaging techniques are often more than required to appropriately distinguish between cell constituents. With embodiments of the multi-line coherent Raman imaging method, high specificity inherent in spectroscopy techniques can be provided, but with increased imaging speed.

Embodiments of the system 100 can be used to provide the fiber-based, power scalable, broadly tunable, multi-color ultrashort excitation source for the spectroscopy/imaging instrument utilized in an embodiment of the multi-line coherent Raman imaging method. In some embodiments, multiple vibrational lines can be simultaneously excited via an embodiment of the system 100. This can facilitate high-specificity imaging of molecular species of interest. Unlike conventional broadband coherent Raman modalities that use a broadband excitation source, such as a supercontinuum, which has a limited brightness due to the distribution of power over the entire bandwidth, embodiments of the system 100 can provide excitation power concentrated into multiple discrete colors to excite desired Raman lines. This can increase sensitivity of a spectroscopy/imaging instrument, reducing the photo-toxicity and enabling the high-speed capabilities typically associated with the single-line Raman.

The high specificity and fast speed that can be enabled from embodiments of the multi-line coherent Raman imaging method may enable new and important studies of dynamic processes in many biomedical applications (e.g., examination of brain tissues—which are among the most complex biological systems). For example, brain tissue generally comprises different types of proteins, lipids, and other compositions, many sharing similar vibrational signatures. Live imaging without the need to process tissue or introduce fluorescent markers can be beneficial for clinical translation in the neurosciences, and can help improve the ability to measure parameters important for research and development related to cures and treatments for various medical conditions.

It should be understood that modifications to the embodiments disclosed herein can be made to meet a particular set of design criteria. For instance, the number of pump sources 16, prisms 36, division stages 12, recombination stages 14, polarizing beam splitters 30, optical fibers 22, wave plates 28, mirrors 32, object lenses 34, and other components can be any suitable number of each to meet a particular objective. The particular configuration of type of such elements can also be adjusted to meet a particular set of design criteria. For instance, the particular type of system 100 components can be configured to meet a particular set of design criteria, such as system efficiency for providing a desired output pulse that meets a pre-selected set of criteria, for example. Therefore, while certain exemplary embodiments of devices and methods of making and using the same have been discussed and illustrated herein, it is to be distinctly understood that the invention is not limited thereto but may be otherwise variously embodied and practiced within the scope of the following claims.

We claim:

1. An optical system, comprising:
   at least one division stage configured to receive at least one parent pulse and divide the at least one parent pulse into at least two divided pulses; and
   at least one nonlinear optical medium configured to receive the at least two divided pulses and generate an output pulse train comprising at least two output pulses;
   wherein the at least one nonlinear optical medium is configured to provide nonlinear parametric gain and is also configured to support and sustain soliton formation for each divided pulse to generate a soliton self-frequency shifted output pulse.

2. The optical system recited in claim 1, wherein at least one divided pulse has a different power from at least one other divided pulse to produce output pulses of at least two different wavelengths.

3. The optical system recited in claim 1, wherein a peak power of each of the at least two divided pulses is adjusted to produce the at least two output pulses, each having an identical wavelength.

4. The optical system recited in claim 3, wherein the at least two output pulses are combined.

5. An optical system, comprising:
   at least one division stage configured to receive at least one parent pulse and divide the at least one parent pulse into at least two divided pulses; and
   at least one nonlinear optical medium configured to receive the at least two divided pulses and generate an output pulse train comprising at least two output pulses;
   wherein the at least one nonlinear optical medium is configured to provide nonlinear parametric gain; and
   wherein the at least one nonlinear optical medium behaves as a parametric gain medium for each divided pulse to generate a signal pulse for each divided pulse, an idler pulse for each divided pulse, and a residual pump pulse for each divided pulse.

6. The optical system recited in claim 5, wherein the signal pulses are combined, and/or the idler pulses are combined, and/or the residual pump pulses are recombined.

7. The optical system recited in claim 6, further comprising a feedback loop configured to cause an amount of at least one of the signal pulse and the idler pulse to be resynchronized with a subsequent parent pulse entering the at least one nonlinear optical medium.

8. The optical system recited in claim 7, further comprising a filter and a wavelength division multiplexer, wherein the feedback loop comprises a single mode fiber connected between the filter and the wavelength division multiplexer.

9. The optical system recited in claim 5, wherein the at least one nonlinear optical medium is one of an optical fiber and a nonlinear solid state medium.

10. An optical system, comprising:
    at least one division stage configured to receive at least one parent pulse and divide the at least one parent pulse into at least two divided pulses;
    at least one nonlinear optical medium configured to receive the at least two divided pulses and generate an output pulse train comprising at least two output pulses;
    at least one combination stage configured to receive the output pulse train from the at least one nonlinear optical medium and cause the at least two output pulses of the output pulse train to combine into a combined output pulse; and
    an information feedback loop to indicate whether temporal overlapping between the output pulses is occurring when generating the combined output pulse so as to introduce active stabilization.

11. The optical system recited in claim 10, wherein the at least one nonlinear optical medium is configured to provide nonlinear parametric gain.

12. An optical system, comprising:
    at least one division stage configured to receive at least one parent pulse and divide the at least one parent pulse into at least two divided pulses;
    at least one nonlinear optical medium configured to receive the at least two divided pulses and generate an output pulse train comprising at least two output pulses;
    a spectroscopy/imaging instrument, wherein the output pulse train is used to provide a multi-color excitation source for the spectroscopy/imaging instrument.

13. The optical system recited in claim 12, further comprising a plurality of division stages.

14. The optical system recited in claim 12, wherein the at least one division stage is configured to cause each divided pulse to be temporally shifted relative to each other.

15. The optical system recited in claim 12, wherein the at least one division stage is configured to cause a polarization state of each divided pulse to be orthogonal to another divided pulse.

16. Optical system recited in claim 12, further comprising at least one wave plate and/or at least one polarizing beam splitter configured to adjust the polarization and/or power of any one divided pulse.

17. The optical system recited in claim 12, wherein the at least one nonlinear optical medium is configured to provide nonlinear parametric gain.

18. The optical system recited in claim 12, further comprising at least one combination stage configured to receive the output pulse train from the at least one nonlinear optical medium and cause the at least two output pulses of the output pulse train to combine into a combined output pulse.

19. The optical system recited in claim 18, wherein the at least one combination stage is configured to compensate for temporal delay induced by birefringence.

20. The optical system recited in claim 12,
wherein the system is configured to direct the output pulse train from the at least one nonlinear optical medium to the at least one division stage so that the output pulse train propagates in a reverse direction through the at least one division stage to cause the at least two output pulses of the output pulse train to combine into a combined output pulse.

* * * * *